United States Patent
Sherman et al.

(10) Patent No.: US 12,541,284 B2
(45) Date of Patent: Feb. 3, 2026

(54) SYSTEM AND METHOD FOR INTEGRATING CUSTOM CONTENT OBJECT REPOSITORIES WITHIN A WEBSITE BUILDING SYSTEM

(71) Applicant: Wix.com LTD., Tel Aviv-Jaffa (IL)

(72) Inventors: Jill Robin Sherman, Sausalito, CA (US); Bartlomiej Lukasz Rogoz, Cracow (PL); Alain Gerald Jacques Miguel, Austin, TX (US)

(73) Assignee: WIX.COM LTD., Tel Aviv (IL)

(*) Notice: Subject to any disclaimer, the term of this patent is extended or adjusted under 35 U.S.C. 154(b) by 216 days.

(21) Appl. No.: 18/401,040

(22) Filed: Dec. 29, 2023

(65) Prior Publication Data

US 2024/0411426 A1 Dec. 12, 2024

Related U.S. Application Data

(60) Provisional application No. 63/472,529, filed on Jun. 12, 2023.

(51) Int. Cl.
| | |
|---|---|
| *G06F 3/0482* | (2013.01) |
| *G06F 3/04817* | (2022.01) |
| *G06F 3/04845* | (2022.01) |
| *G06F 40/40* | (2020.01) |
| *G06Q 30/0601* | (2023.01) |
| *G06T 11/00* | (2006.01) |

(52) U.S. Cl.
CPC ........ *G06F 3/0482* (2013.01); *G06F 3/04845* (2013.01); *G06T 11/00* (2013.01); *G06F 3/04817* (2013.01); *G06F 40/40* (2020.01); *G06Q 30/0641* (2013.01); *G06T 2200/24* (2013.01)

(58) Field of Classification Search
CPC .............. G06F 3/0482; G06F 3/04845; G06F 3/04817; G06F 40/40; G06T 11/00; G06T 2200/24; G06Q 30/0641
See application file for complete search history.

(56) References Cited

U.S. PATENT DOCUMENTS

| | | | |
|---|---|---|---|
| 7,509,374 B2 * | 3/2009 | Trinh | G06F 16/9577 709/217 |
| 10,073,923 B2 | 9/2018 | Koren et al. | |
| 10,185,703 B2 | 1/2019 | Abrahami | |
| 10,209,966 B2 | 2/2019 | Abrahami et al. | |
| 11,809,688 B1 * | 11/2023 | Parasnis | G06F 3/04845 |

(Continued)

*Primary Examiner* — Cao H Nguyen
(74) *Attorney, Agent, or Firm* — Alston & Bird LLP

(57) ABSTRACT

Embodiments provide for integrating custom content object repositories within a website building system. In some embodiments, a content object selection interface is generated comprising a plurality of candidate content objects selected based at least in part on a website identifier and one or more website editing historical interactions. The content object selection interface is rendered via a first computing device associated with an editing user identifier. Using a trained customization model and based at least in part on the editing user identifier, one or more selected candidate content objects are transformed into a custom contextualized content object. The custom contextualized content objects are added to a custom content object repository associated with the website identifier.

30 Claims, 27 Drawing Sheets

(56) References Cited

U.S. PATENT DOCUMENTS

| | | | |
|---|---|---|---|
| 12,131,137 B2* | 10/2024 | Geva | G06F 8/38 |
| 2020/0233924 A1* | 7/2020 | George | G06F 40/186 |
| 2021/0065181 A1* | 3/2021 | Cron, Jr. | G06Q 30/0603 |
| 2023/0051123 A1* | 2/2023 | Domshlak | G06Q 10/087 |

* cited by examiner

FIG. 3D

Click on the button & you have a store with branded products

Image Prompt:
Doraemon Super Mario Ultraman and Thor dance as a group as if they were members of Blackpink

TO FIG. 4C-1

25 Oz Vacuum Insulated Water Bottle
$34.00
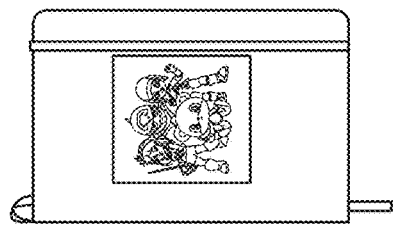
Ambassador Bound JournalBook
$14.00
FROM FIG. 4C
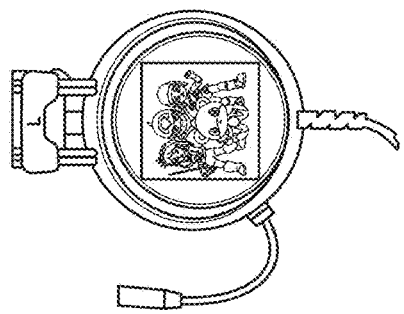
Wired Gaming Headphones
$73.25
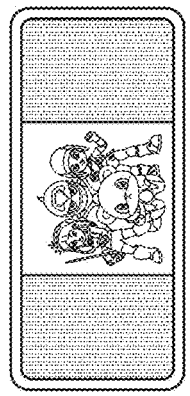
Wireless Speaker
$33.75
FIG. 4C-1

SYSTEM AND METHOD FOR INTEGRATING CUSTOM CONTENT OBJECT REPOSITORIES WITHIN A WEBSITE BUILDING SYSTEM

CROSS-REFERENCE TO RELATED APPLICATIONS

The present application claims priority to U.S. Provisional Application Ser. No. 63/472,529, titled "SYSTEM AND METHOD FOR SMART CATALOGS," filed Jun. 12, 2023, the entire contents of which are incorporated herein by reference in their entirety.

TECHNOLOGICAL FIELD

Example embodiments of the present disclosure relate generally to visual editing technologies and, more particularly, to a system, apparatus, method, and computer program product for integrating custom content object repositories within a website building system.

BACKGROUND

Various platforms may offer capabilities associated with content offerings. However, integrating custom content repositories is computationally complex and unpredictable. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

Embodiments relate to integrating custom content object repositories within a website building system. In some embodiments, a content object selection interface is generated comprising a plurality of candidate content objects selected based at least in part on a website identifier and one or more website editing historical interactions. The content object selection interface is rendered via a first computing device associated with an editing user identifier. Using a trained customization model and based at least in part on the editing user identifier, each of one or more selected candidate content objects is transformed into a custom contextualized content object. The custom contextualized content objects are added to a custom content object repository associated with the website identifier.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1A:
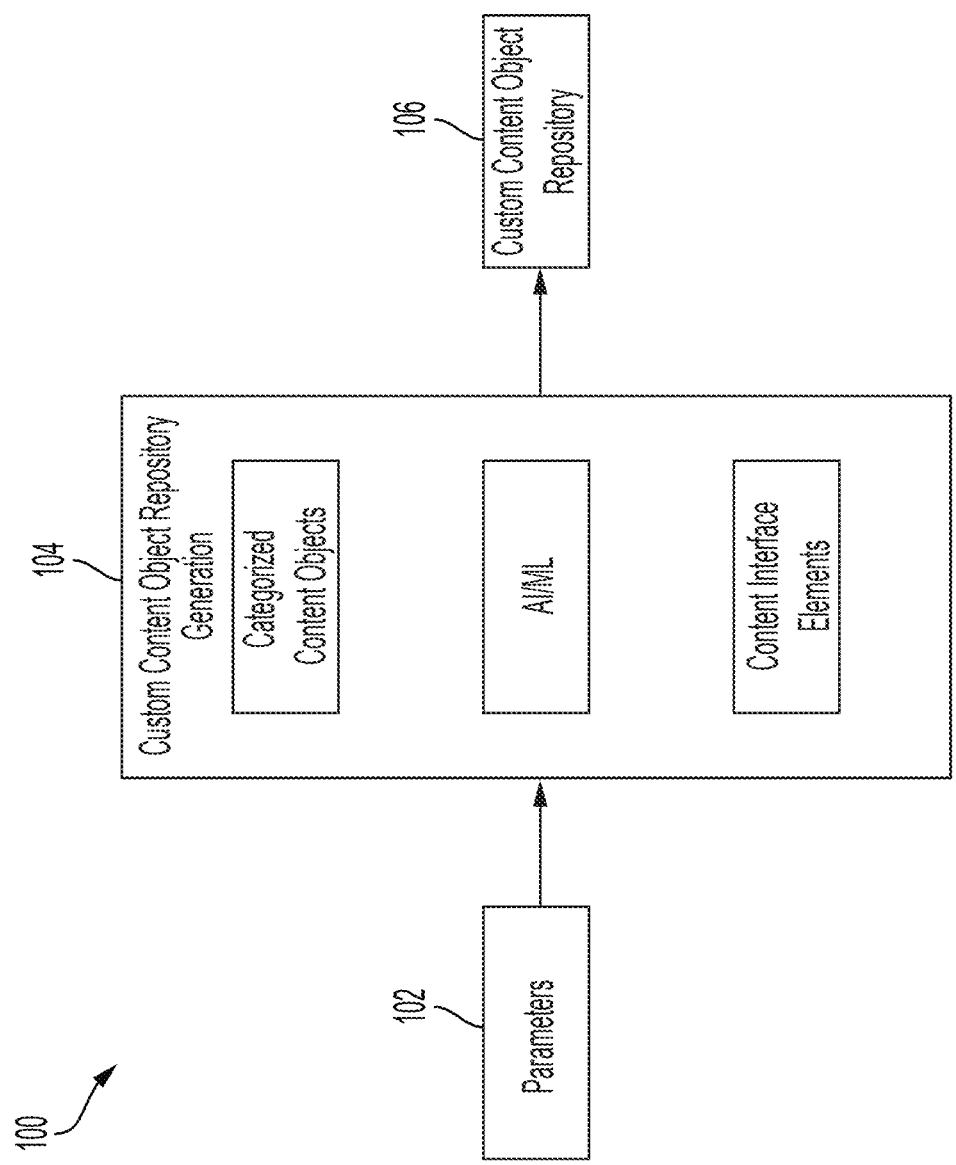
Figure 1B:
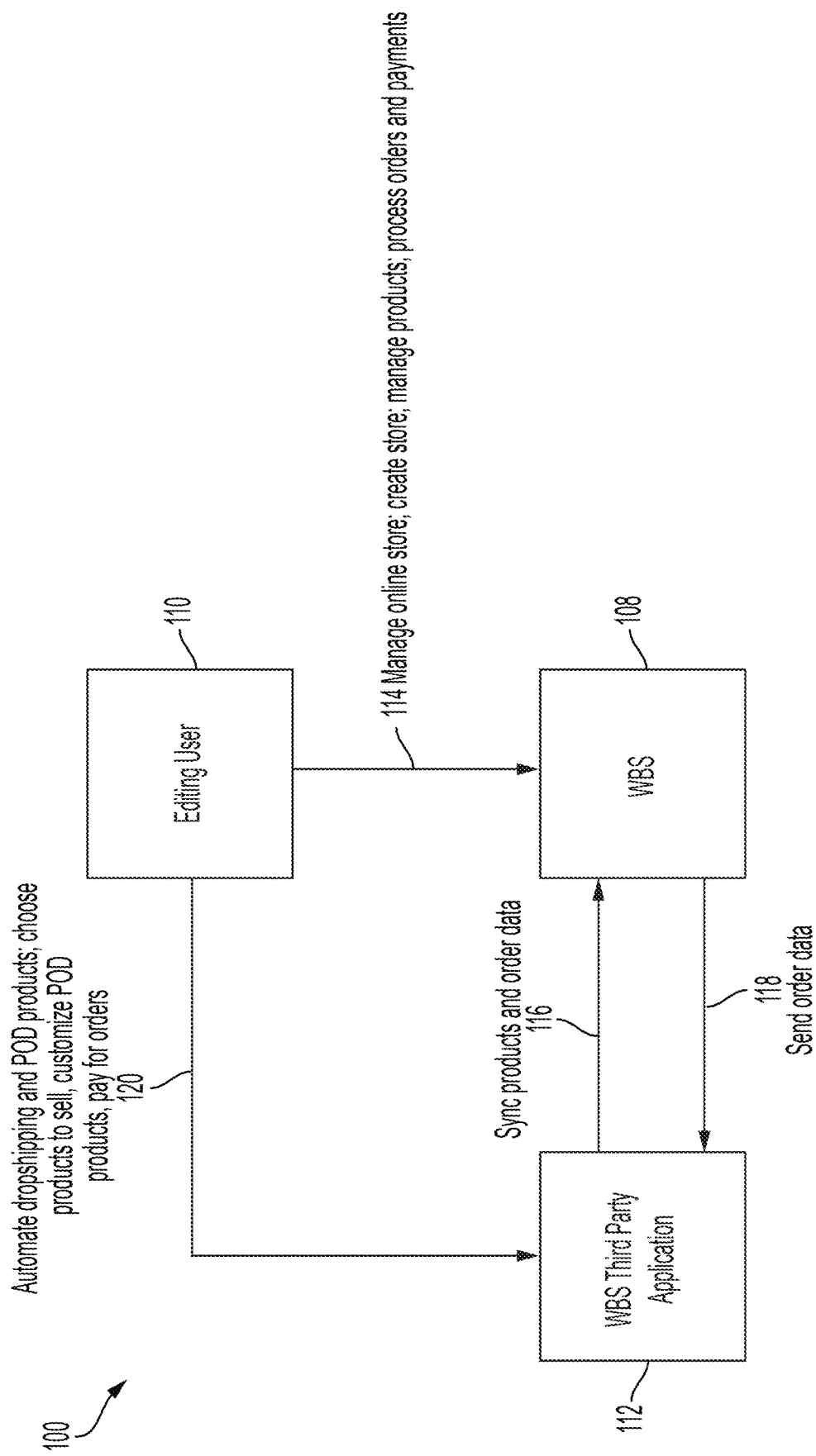
Figure 2:
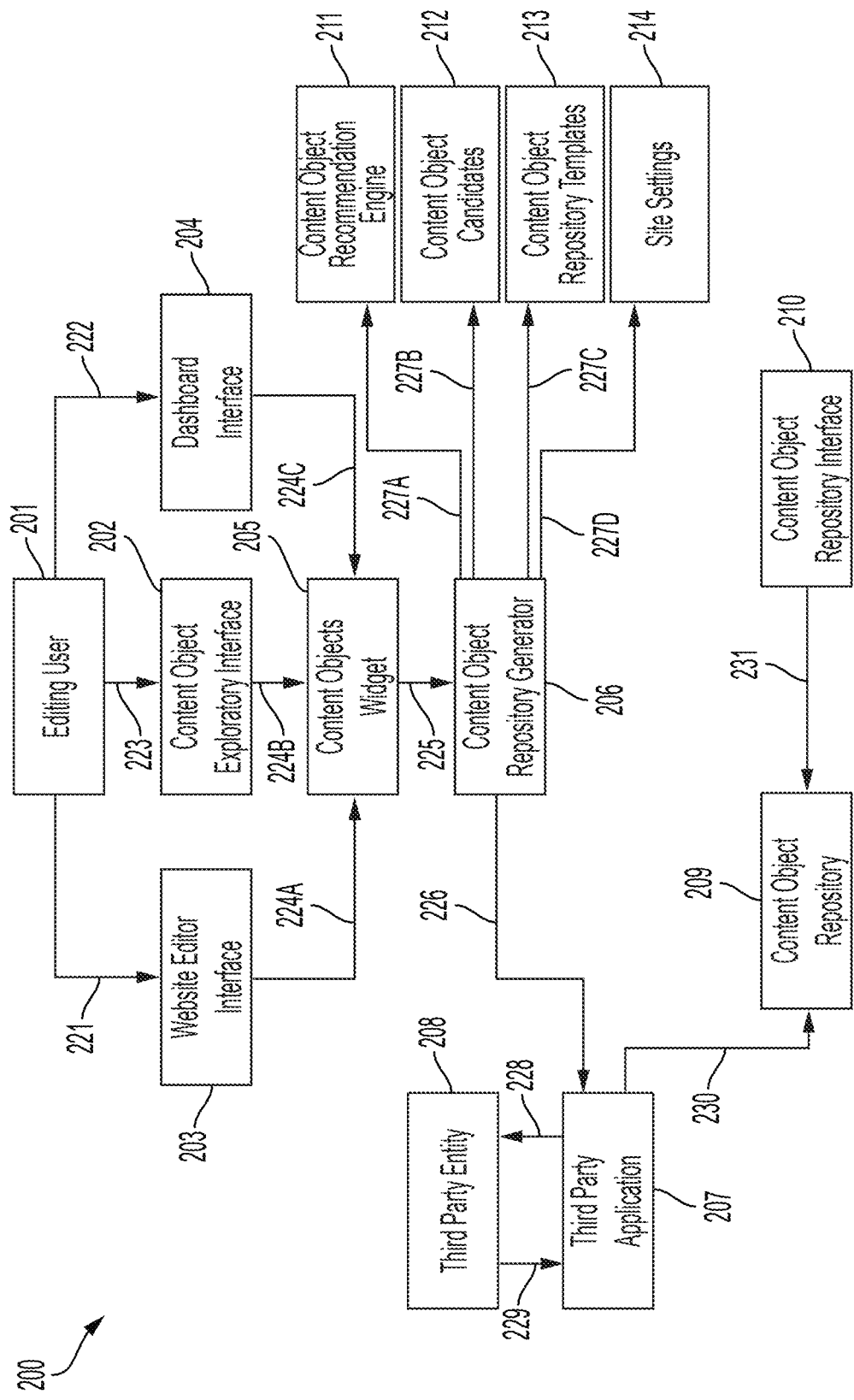
Figure 4A:
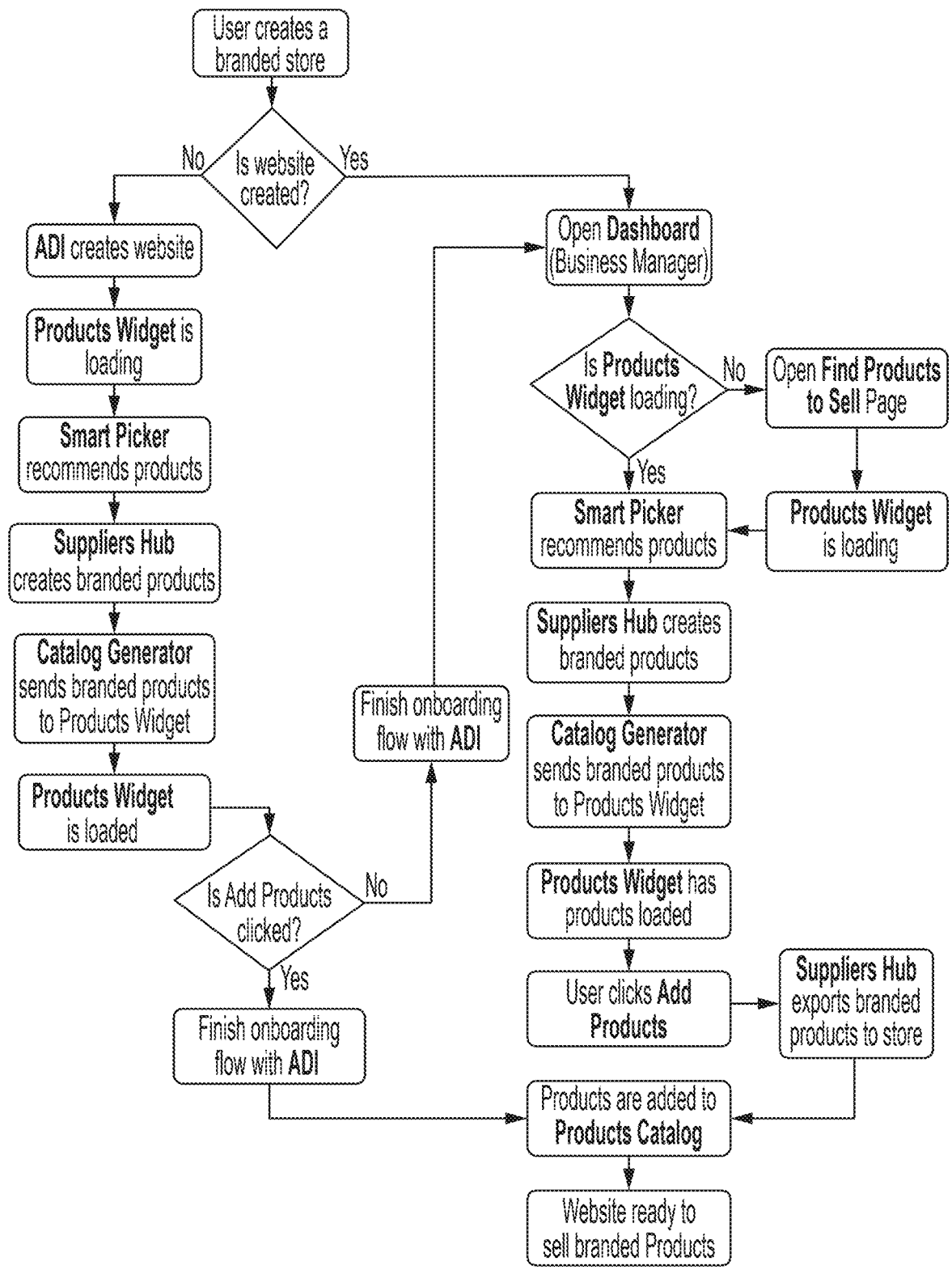
Figure 4B:
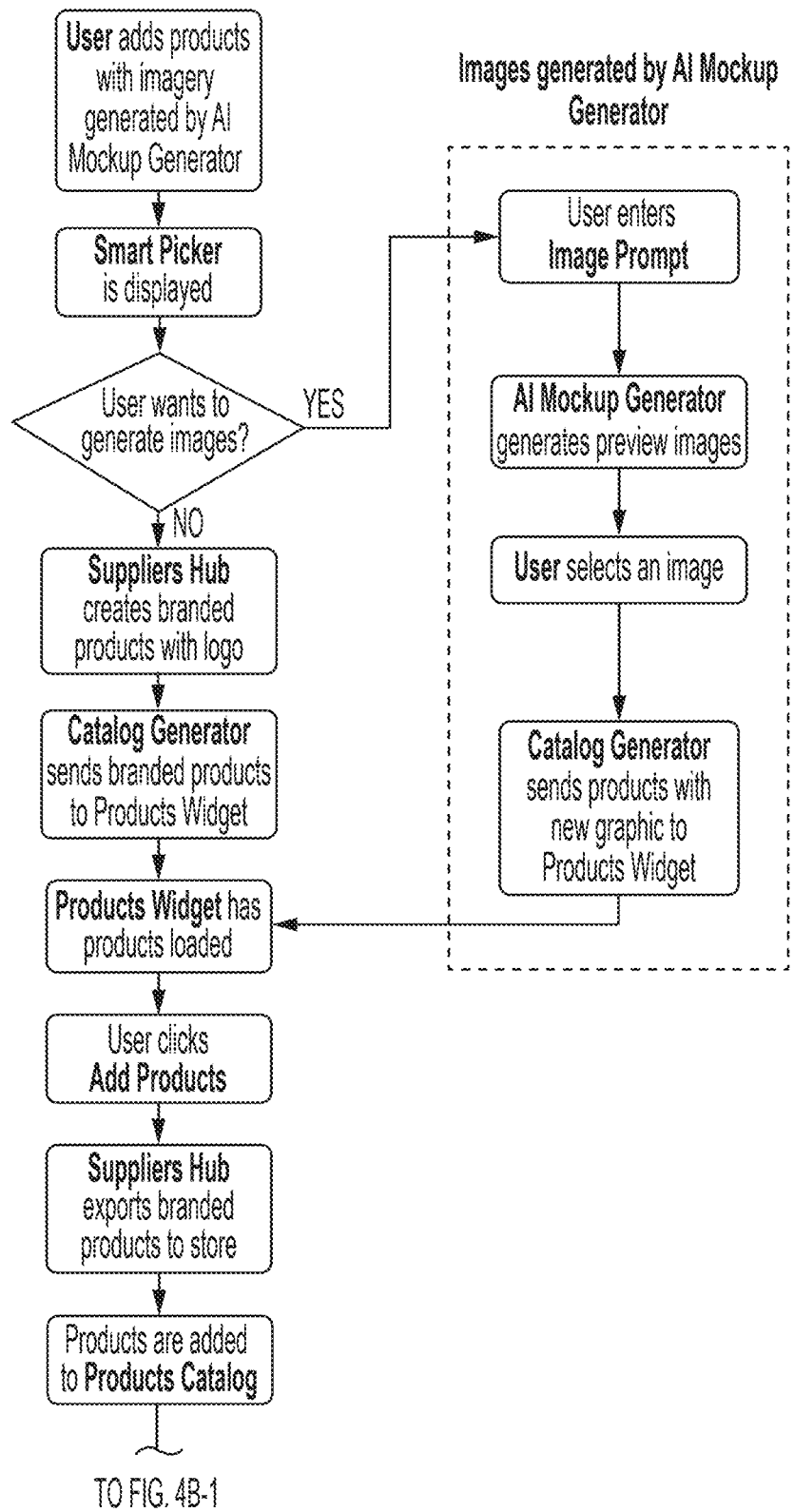
Figures 1, 4B:
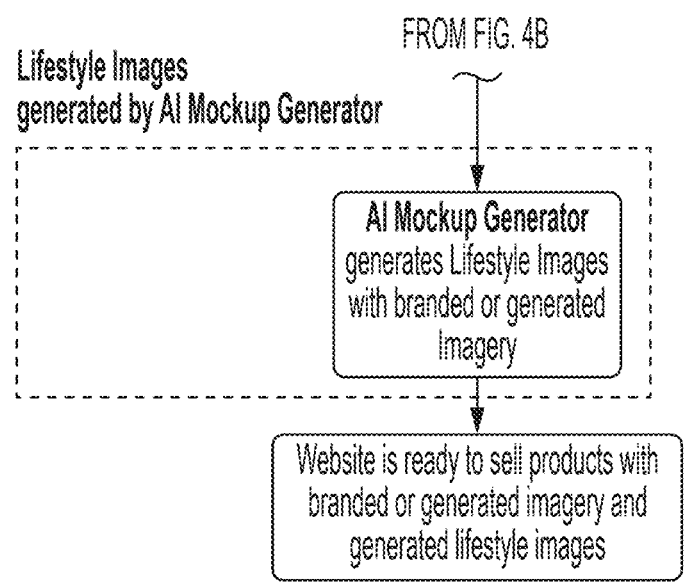
Figure 4C:
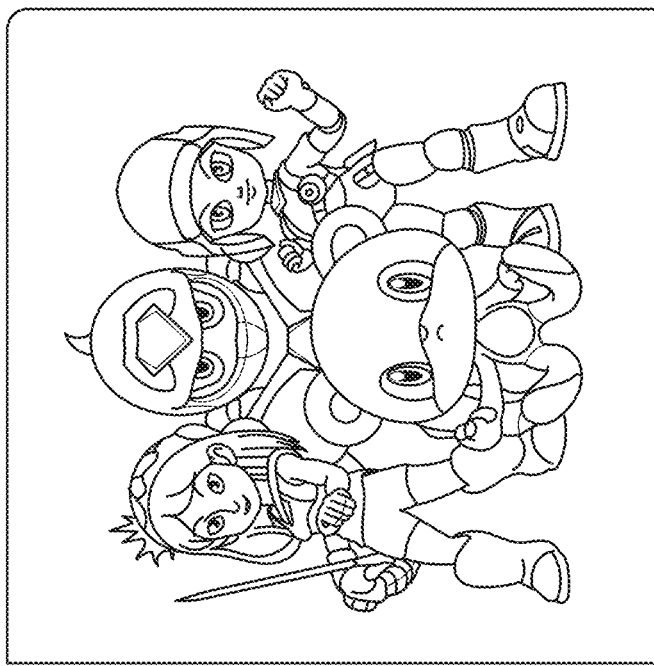
Figure 4C:
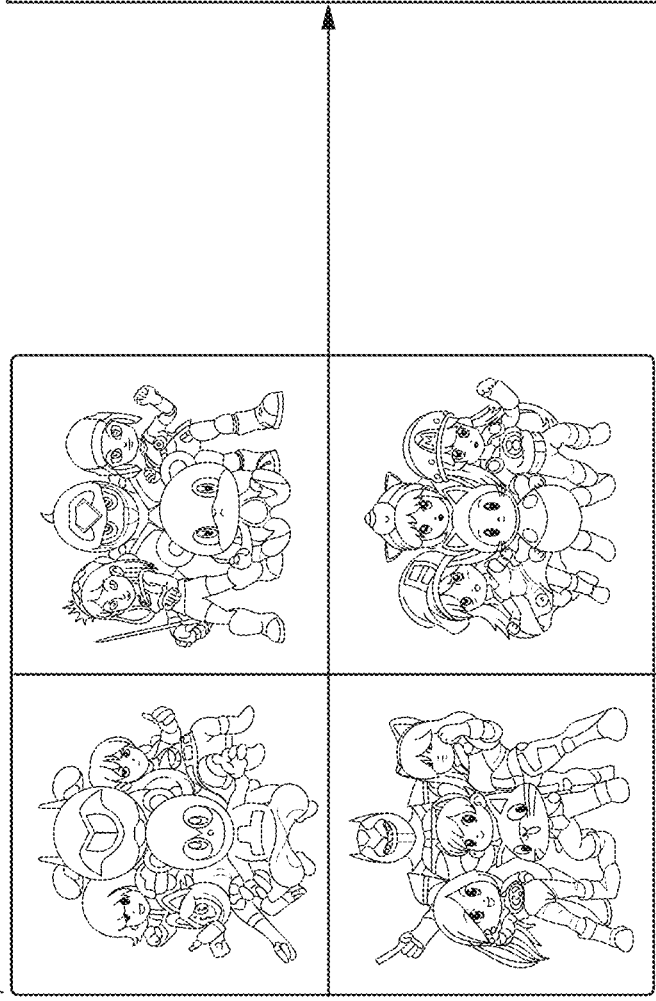
Figure 4D:
Figure 4D:
Figure 5A:
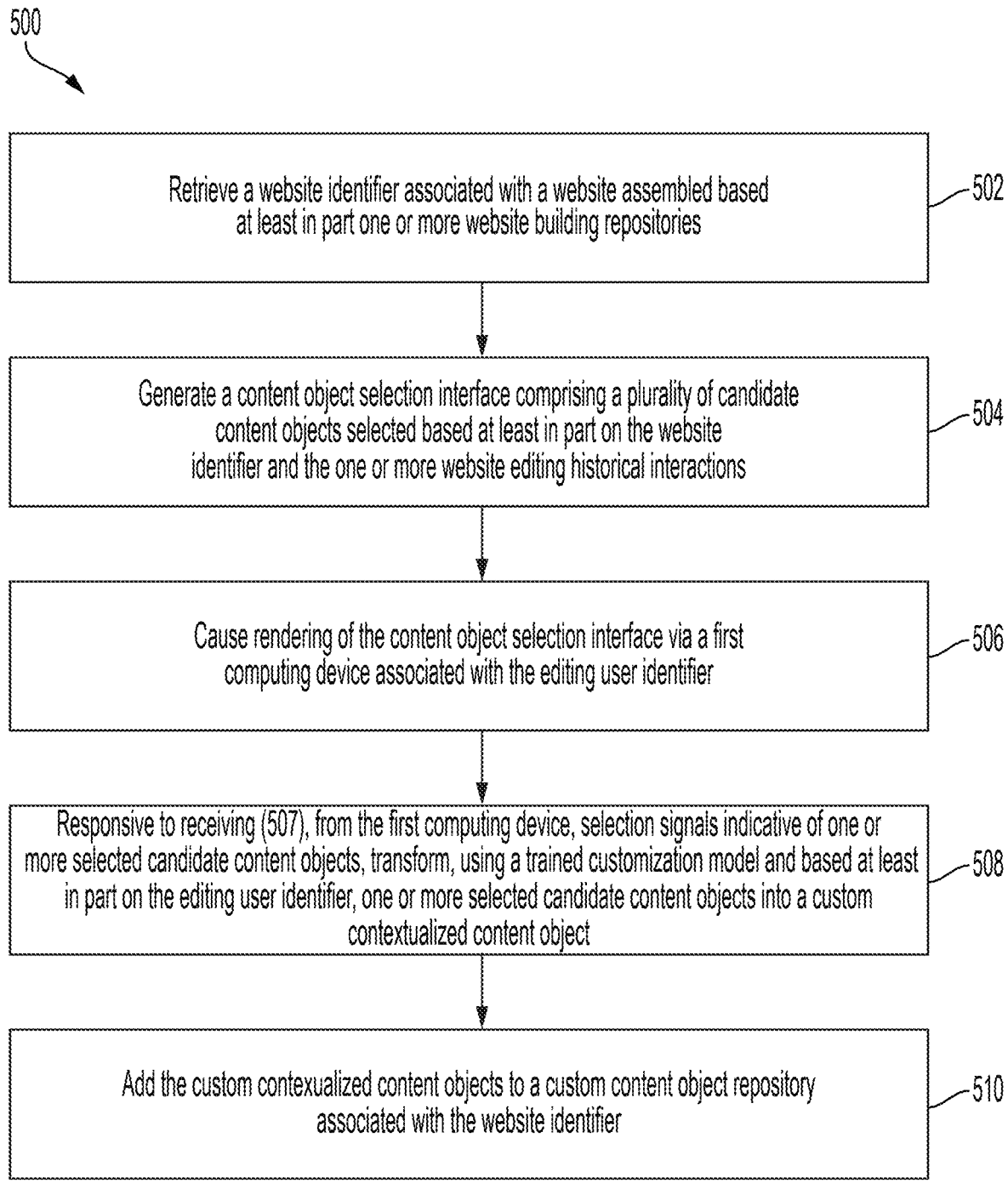
Figure 5B:
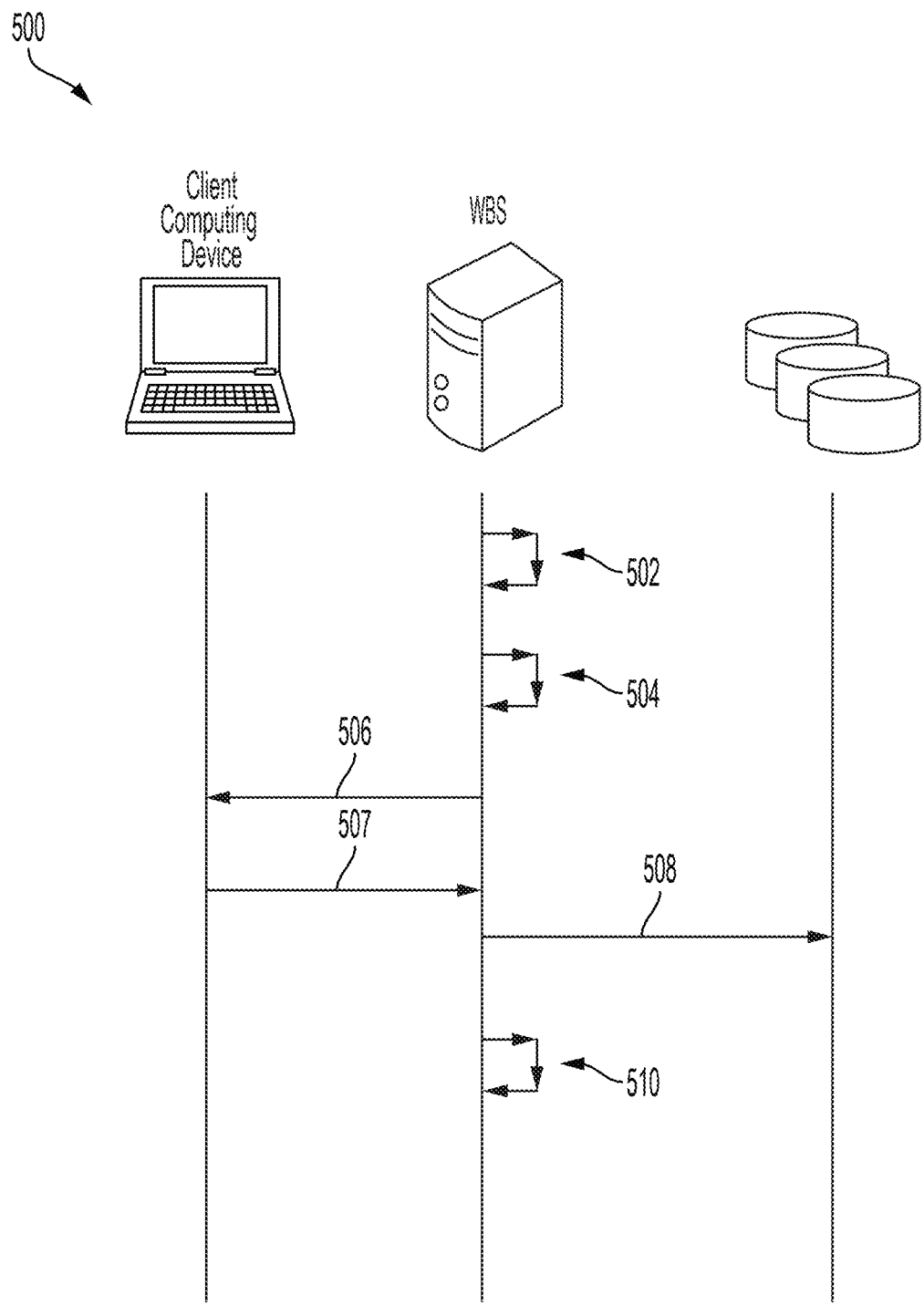
Figure 6:
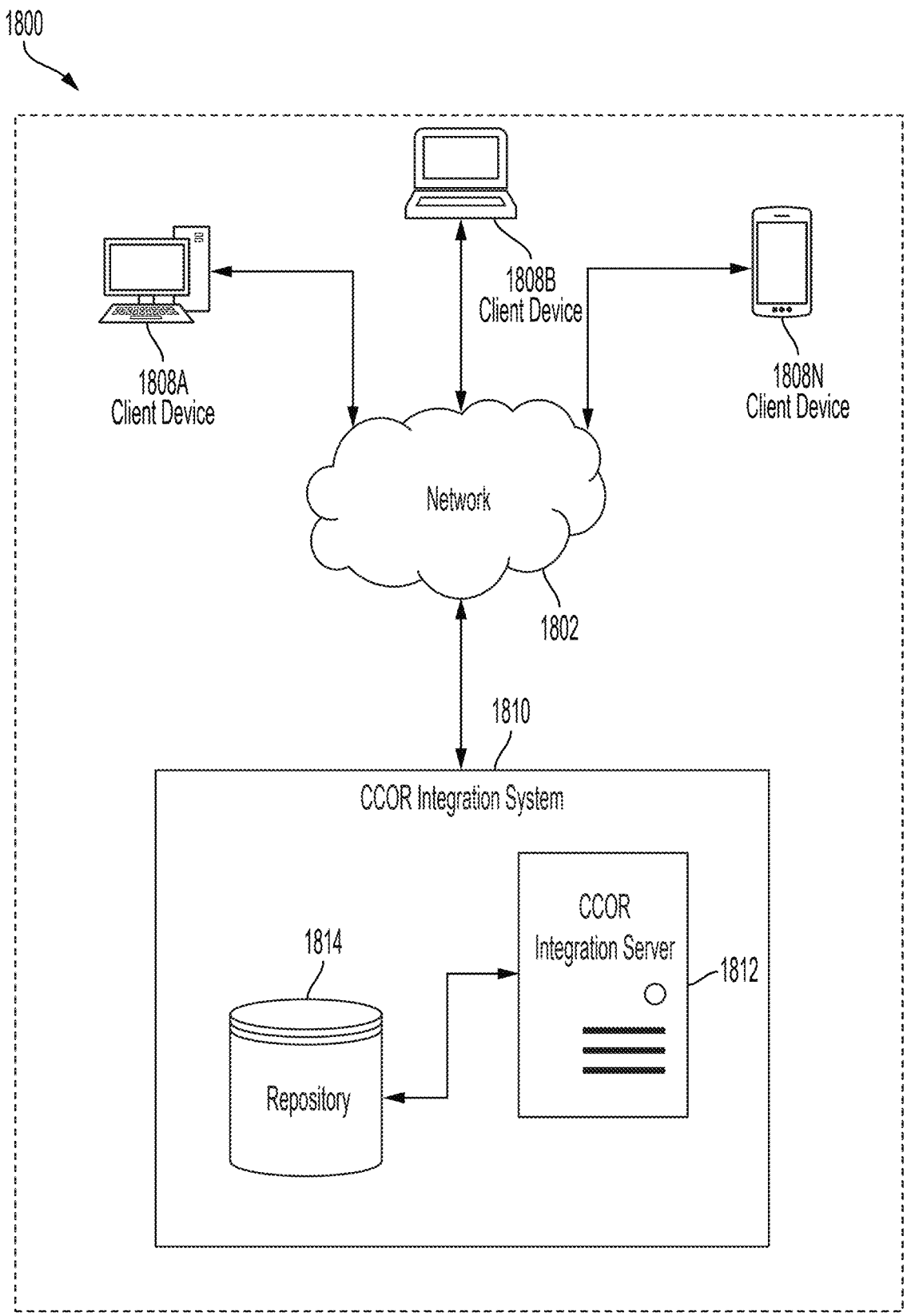
Figure 7:
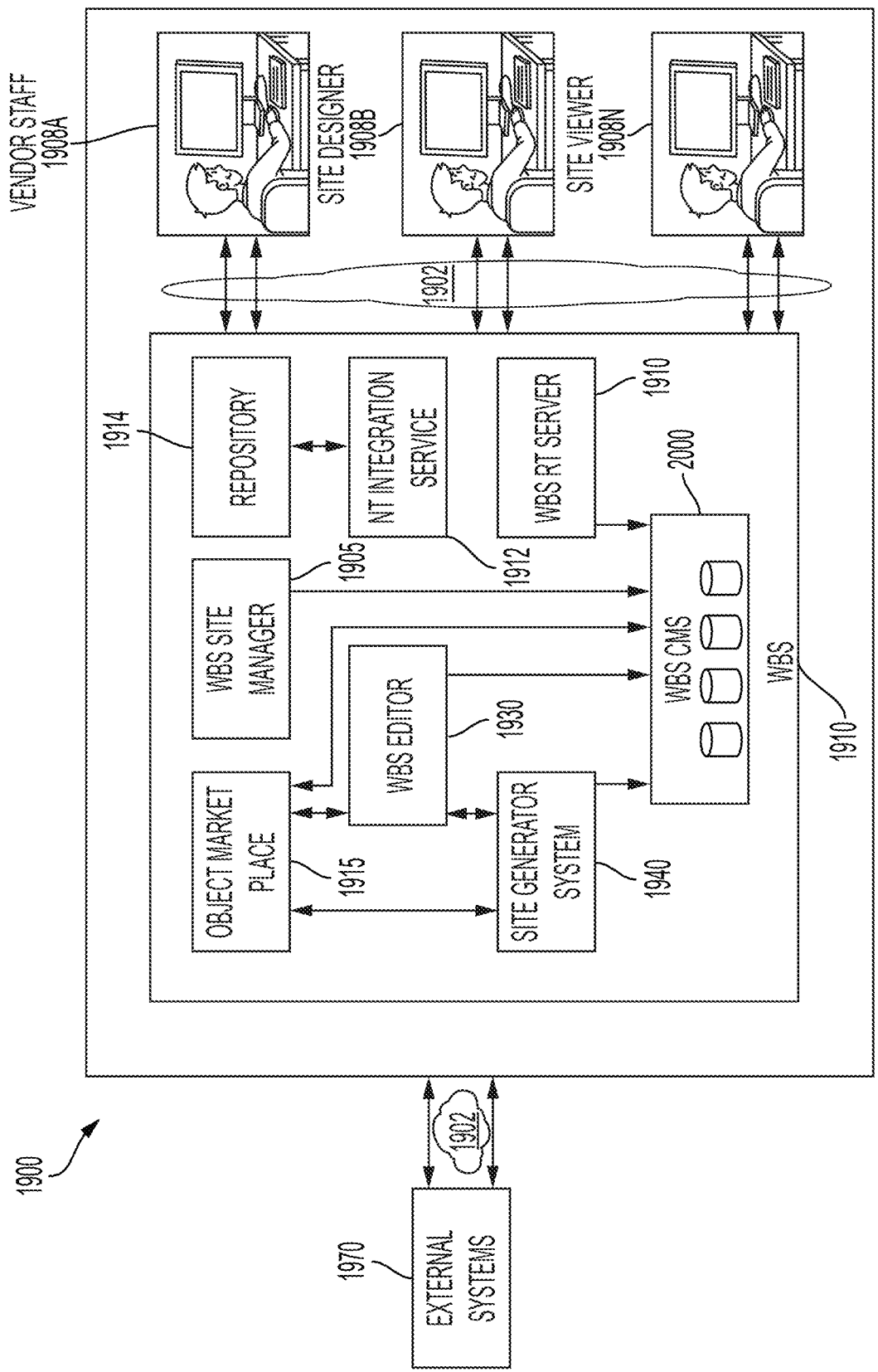
Figure 8:
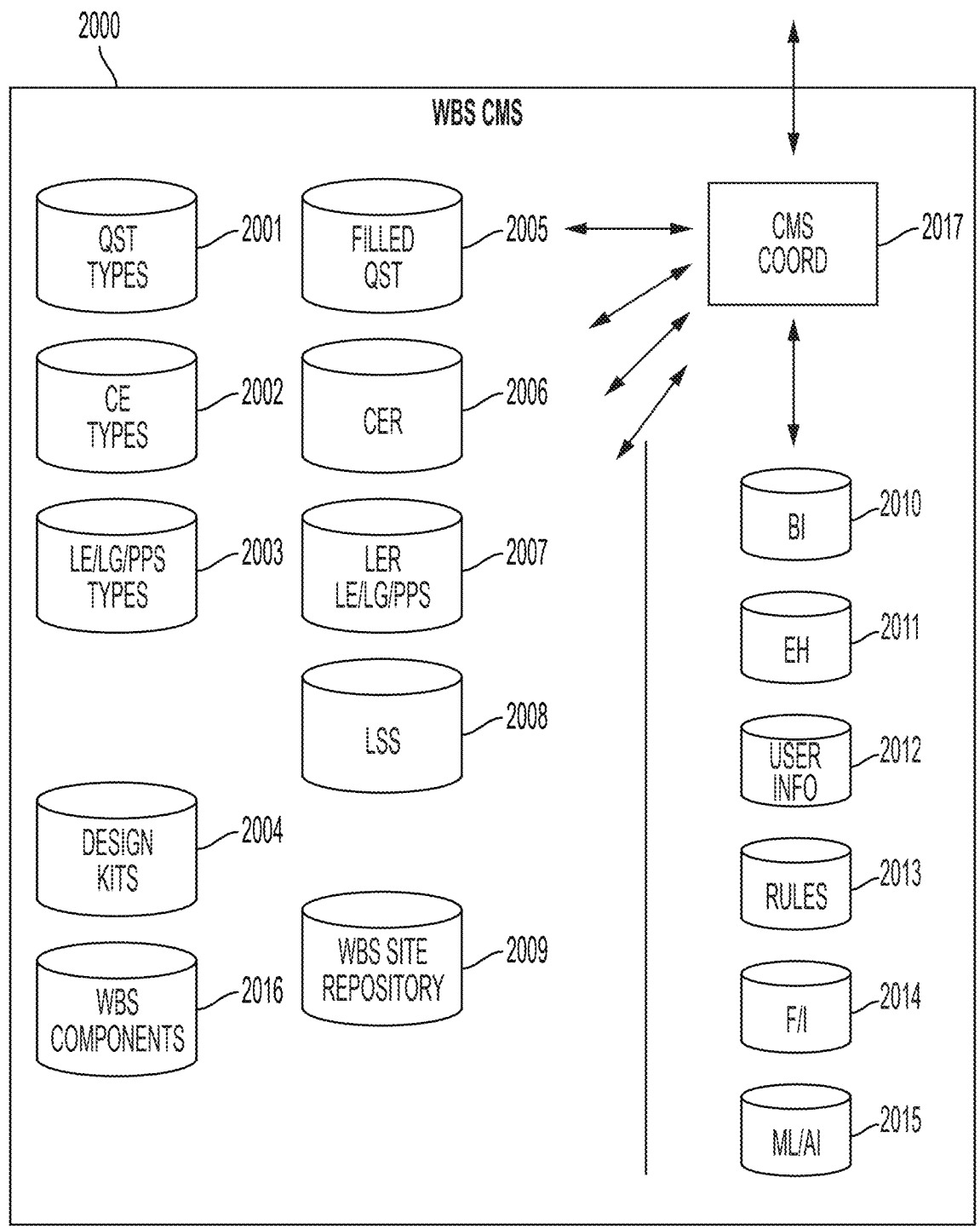
Figure 9:
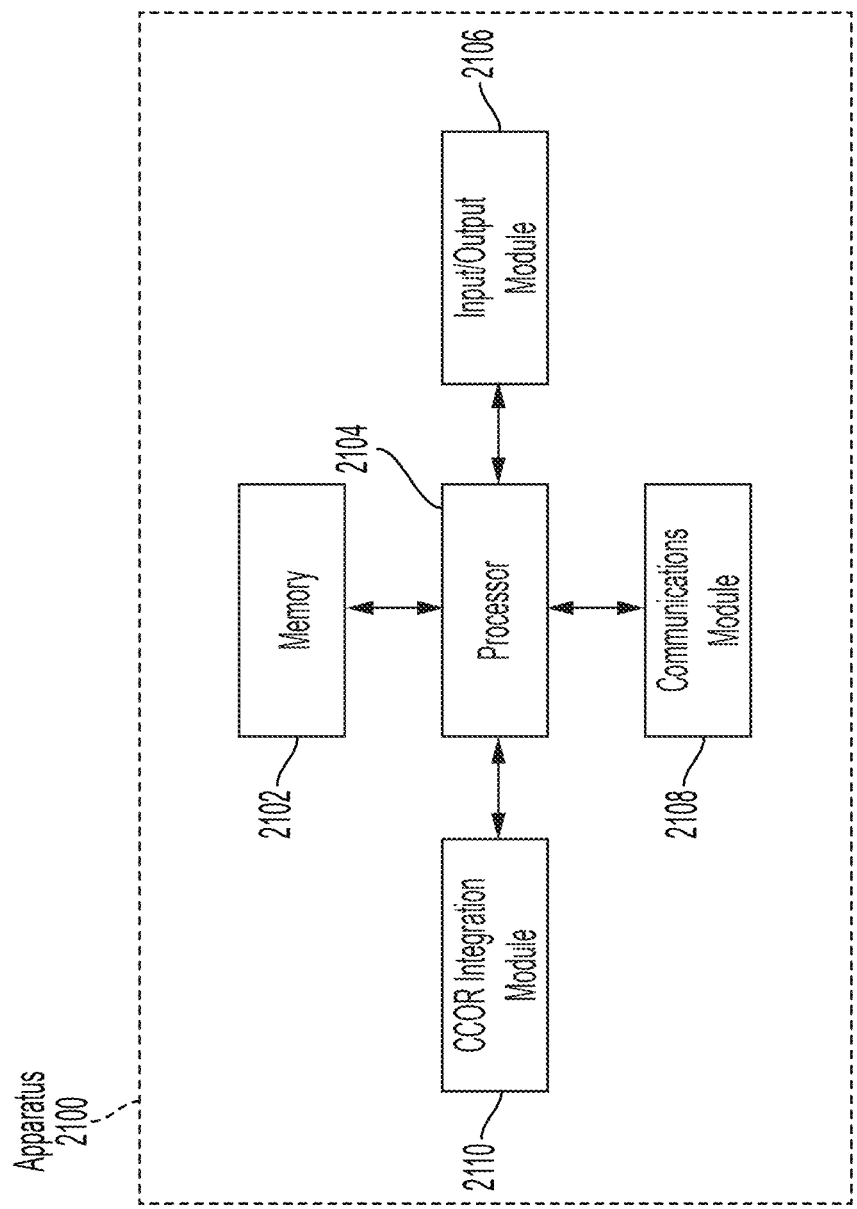
Figure 10:
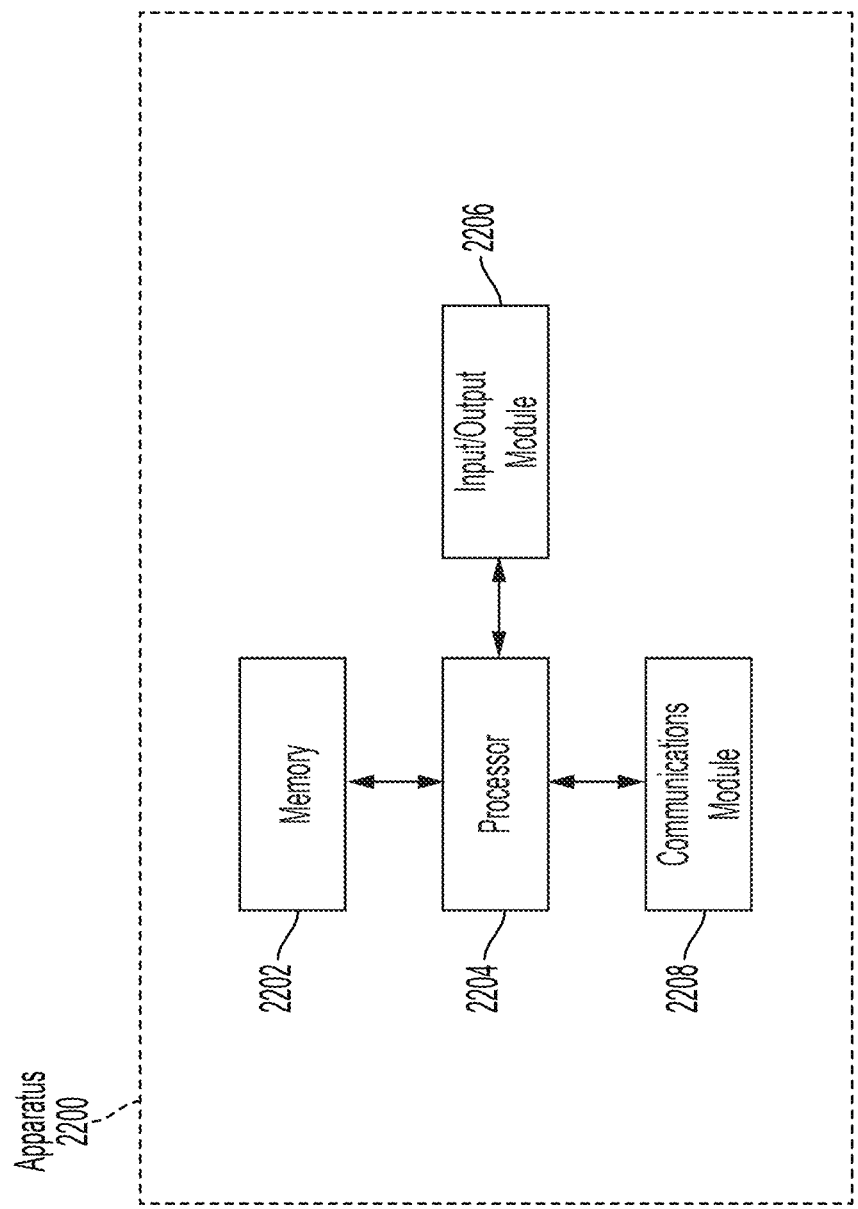

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings. Some embodiments may include the components arranged in a different way:

FIGS. 1A and 1B illustrate an example system architecture within which embodiments of the present disclosure may operate;

FIG. 2 illustrates a schematic block diagram of an example architecture for custom content object repository integration in accordance with some example embodiments described herein;

FIGS. 3A, 3B, 3C, 3D, 3E, 3F, 3G, 3H, 3I, 3J, and 3K illustrate example interfaces in accordance with example embodiments described herein;

FIGS. 4A, 4B, and 4B-1 depict example operations associated with custom content object repository integration in accordance with some example embodiments described herein;

FIGS. 4C, 4C-1, and 4D depict example interfaces in accordance with some example embodiments described herein;

FIG. 5A illustrates example operations associated with custom content object repository integration in accordance with some example embodiments described herein;

FIG. 5B illustrates a signal diagram of example operations associated with custom content object repository integration in accordance with some example embodiments described herein;

FIG. 6 illustrates a block diagram of an example system that may be specially configured within which embodiments of the present disclosure may operate;

FIG. 7 illustrates a schematic block diagram of example components of an example website building system in accordance with some example embodiments described herein;

FIG. 8 illustrates a schematic block diagram of example repositories of an example content management system of website building system in accordance with some example embodiments described herein;

FIG. 9 is a schematic block diagram of example modules for use in an example server apparatus in accordance with some example embodiments described herein; and FIG. 10 is a schematic block diagram of example modules for use in an example client apparatus in accordance with some example embodiments described herein.

DETAILED DESCRIPTION

One or more example embodiments now will be more fully hereinafter described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments may be practiced without these specific details (and without applying to any particular networked environment or standard). It should be understood that some, but not all embodiments are shown and described herein. Indeed, the embodiments may be embodied in many different forms, and accordingly, this disclosure should not be construed as limited to the embodiments set forth herein.

Rather, these embodiments are provided so that this disclosure will satisfy applicable legal requirements. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Example embodiments of the present disclosure may proceed to implement integration of custom content object repositories in a number of ways. Accordingly, various processes in accordance with the present disclosure are described herein. Each method or process described herein may include any number of operational blocks defining the process and/or a portion thereof. It should be appreciated that in some embodiments the various processes and/or sub-processes described herein may be combined in any manner, such that the embodiment is configured to perform each aspect of the various processes in combination, in parallel and/or serially. In some embodiments, at least one additional and/or at least one alternative operation is performed in one or more of the described processes, and/or at least one operation is removed from one or more of the described processes.

Additionally, optional operations may be depicted in the processes utilizing dashed (or "broken") lines. In this regard, it should be appreciated that the processes described herein are examples only and the scope of the disclosure is not limited to the exact operations depicted and described, and the depicted and described operations should not limit the scope and spirit of the embodiments described herein and covered in the appended claims.

Overview

Embodiments herein relate to integrating custom content object repositories within a website building system. Embodiments herein provide for a content objects widget that enables users of a website building system to curate their own collection of branded physical goods. The products can be fully personalized such as having a logo (e.g., image, text, or combination) with different colors, sizes, and aspect ratios. The logo can automatically be split into the product or several products. Personalization can happen in one product, several, and all, whether chosen beforehand or not. It will be appreciated that, while example embodiments herein are described and depicted with respect to physical goods, the present disclosure is applicable to digital goods and virtual goods and such alternative embodiments are within the scope of the present disclosure.

Content objects (e.g., products) can be selected for inclusion in a custom content object repository based on an editing user's behavior or an end user's browsing and purchase behavior, as well as sales, using AI/ML. (Reference may be made to techniques described in U.S. Pat. No. 11,275,815 patent for image enhancement and logo creation, for a detailed description of the improvement of the creation process (the contents of which are incorporated herein by reference in their entirety)).

Embodiments herein provide for display of "lifestyle" images where a custom content object appears to be positioned relative to (e.g., worn by) a physical model or in a real-life situation, without the need for actually printing a logo onto the custom content object and physically capturing a photograph of the donned apparel or good. Embodiments herein eliminate technical steps otherwise required to display nearly indistinguishable customized images, as well as resources associated with capturing customized images without the present embodiments. All products can be further customized within the WBS platform, enabling the logos and variants of the logo to be placed in an alternate location or sized differently. Variants of the logo picture can be created per product category or specific product and matching lifestyle image to product (or category) per user per e-shop can be done by AI/ML. Additional user parameters can be used such as user's location, industry, type, age in the system, experience level, e-shop size and sales, business volume, typical order parameters (size, quality, speed of response, etc.), available shipping methods, purchasing and sales information, pricing information, fulfillment optimization, and more as further described in US 2023-0051123 (the contents of which are incorporated herein by reference in their entirety).

It will be appreciated that, while example embodiments and implementations herein describe models and data sets associated with depicted embodiments or examples, each model or set of models described herein may share inputs, input training data, architecture, or updated training data with other models or implementations described herein to improve training, performance, feature extraction, and/or other model parameters associated with the other models without departing from the scope of the present disclosure.

Example Architecture

FIGS. 1A and 1B illustrate an example system architecture within which embodiments of the present disclosure may operate. In FIG. 1A, an example system architecture 100 for integration of custom content object repositories within a WBS may include the provision of parameters 102 (e.g., category associated with a website or editing user identifier) to a module (or modules) for custom content object repository (CCOR) generation 104. The CCOR generation 104 may include categorized content objects, one or more trained machine learning models, and content interface elements (e.g., catalog or repository templates). A custom content object repository (CCOR) 106 is provided as output.

In FIG. 1B, an example system architecture 100 for integration of custom content object repositories within a WBS may include a WBS 108, a WBS third party application 112 (e.g., a suppliers hub), and an editing user 110 (e.g., a merchant with a website via the WBS). The editing user 110 may interact 120 with the WBS third party application 112 to automate drop shopping and print-on-demand products. That is, the editing user 110 may select content objects to offer (e.g., sell), customize products, and pay for orders with the WBS third party application 112. The editing user 110 may interact 114 with the WBS 108 by managing an online marketplace (e.g., creating a store, managing products, processing orders and payments). The WBS 108 provides 116 order data to the WBS third party application 112, and receives 118 data for synchronizing products and order fulfillment data from the WBS third part application 112.

FIG. 2 illustrates a schematic block diagram of an example architecture 200 for custom content object repository integration in accordance with some example embodiments described herein. In FIG. 2, an editing user 201 can create 221 a new account and storefront using the WBS (e.g., editing system) via a website editor interface 203. The website editor interface is configured to allow users to create a store in a few steps, catered to the user's specific category and parameters (e.g., needs). The editing user 201 can also add 222 catalogs of products to the storefront using a dashboard interface 204. The dashboard interface 204 is configured to display products widgets in different contexts. The editing user 201 can also add 223 a catalog of products to the storefront using a content object exploratory interface 202. The content object exploratory interface 202 is configured to render tools to browse and add products to a digital storefront.

The architecture 200 includes a content objects widget 205 which can be displayed (e.g., 224A, 224B, 224C) according to various contexts to render visualization of personalized products within catalog templates, enabling users to create a store with branded products directly associated with their business. The content objects or products widget is an agnostic widget that can be placed across the WBS system (as further detailed below).

The content objects widget 205 may request 225 products and templates via a content object repository generator 206, which retrieves (e.g., 227A, 227B, 227C, 227D) data from several sources to assist with content object repository generation. The requested data can include products recommended for a website or editing user identifier based on industry and site content (227A) from a content object recommendation engine 211. The requested data can include product information (227B) from a content object candidates 212. The requested data can include catalog template data 227C from content object repository templates 213. The requested data can include site settings (e.g., industry, imagery) 227D from site settings 214. It will be appreciated that 211, 212, 213, 214 may be configured as modules or repositories in accordance with the description herein.

The content object repository generator 206 also requests 226 customized products with a merchant's branding/imagery from a third-party application 207 (e.g., a suppliers hub). The third-party application 207 interacts 228, 229 with third party entity/partners 208 to update print-on-demand products and create print on demand projects from blank products.

The content object recommendation engine 211 may include one or more trained machine learning models configured to help assign relevant products for a specific website or editing user identifier (e.g., merchant). The content object recommendation engine 211 is configured to leverage all the data the WBS has associated with the website and/or editing user identifier, such as the way she edits the site, her interactions with the WBS, the location/geography of the e-shop, type, current business information, customer information, and her payments history. Examples of such an engine are provided in United States Patent Publication No. US2023/0051123, the contents of which are incorporated herein by reference in their entirety.

The content object repository interface 210 (e.g., merchant storefront) may be a website or storefront with visualization of generated products for sale.

In embodiments herein, a dropshipping model may include a retail model where the seller (Merchant) does not keep products in stock but instead transfers end-customer orders to a Supplier who directly ships the products to the customer. Ready to sell or RTS products are products provided by a supplier, which are ready to sell, and do not require further customization. Print-on-demand (POD) products are products provided by a POD supplier), which require further customization by adding design (e.g., printed/engraved or with any other technique put on the product), in association with the website or editing user identifier (e.g., the seller or user). Such customization may include added images or patterns or other types of customizations.

In embodiments herein, a content object widget (e.g., a products widget, or 205) may include a front-end visible component responsible for displaying personalized products within catalog templates, enabling users to create a store filled with branded products directly associated with their business. It is an agnostic widget that can be placed across the WBS system. In embodiments herein, a content object repository generator (e.g., catalog generator, or 206) may include a service providing products and catalog template for the content objects widget. The content object repository generator requests customized products with branding personalized to a website identifier or editing user identifier from the third-party application (e.g.. suppliers Hub). "Lifestyle" images—images where the product is rendered as if it were actually worn by models or in a real-life situation, are created using an AI-powered mockup generator which automatically takes the graphic, adds it to products, and then creates images of the products on people or in places.

In some embodiments, a repository stores RTS and POD products according to categories, including data such as product name, description, category, sales data, order quantity, last order date, and the like. A content object repository templates repository may include a database of possible widget templates, storing information about the layout of the products and the number of products to generate in the widget (for example Slider Gallery, Grid Gallery, Selected Products Layout). In some embodiments, a repository stores site preferences, like industry, store name, store category, logo, and other imagery/text/design elements.

Figure 3A:
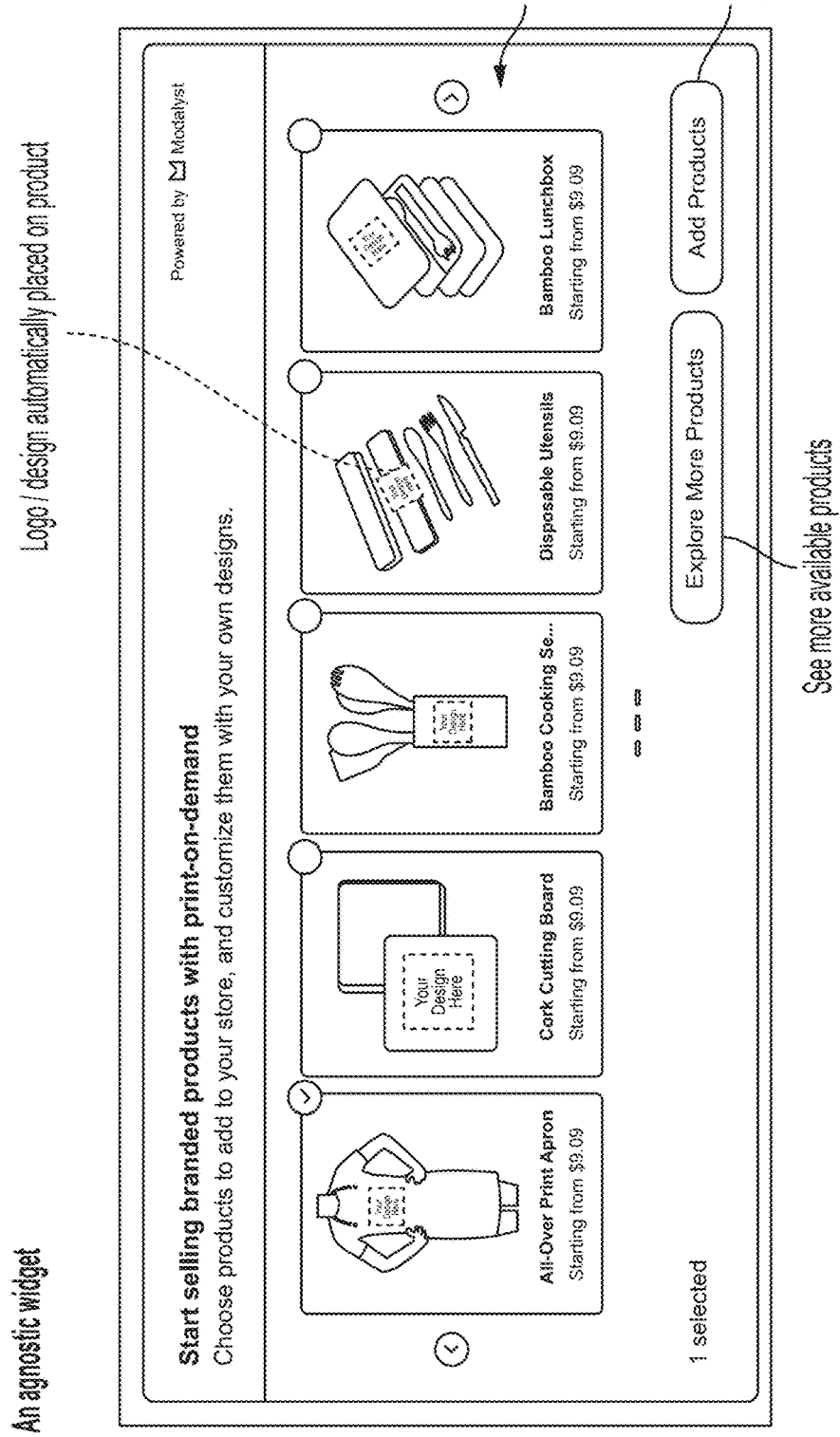
Figure 3B:
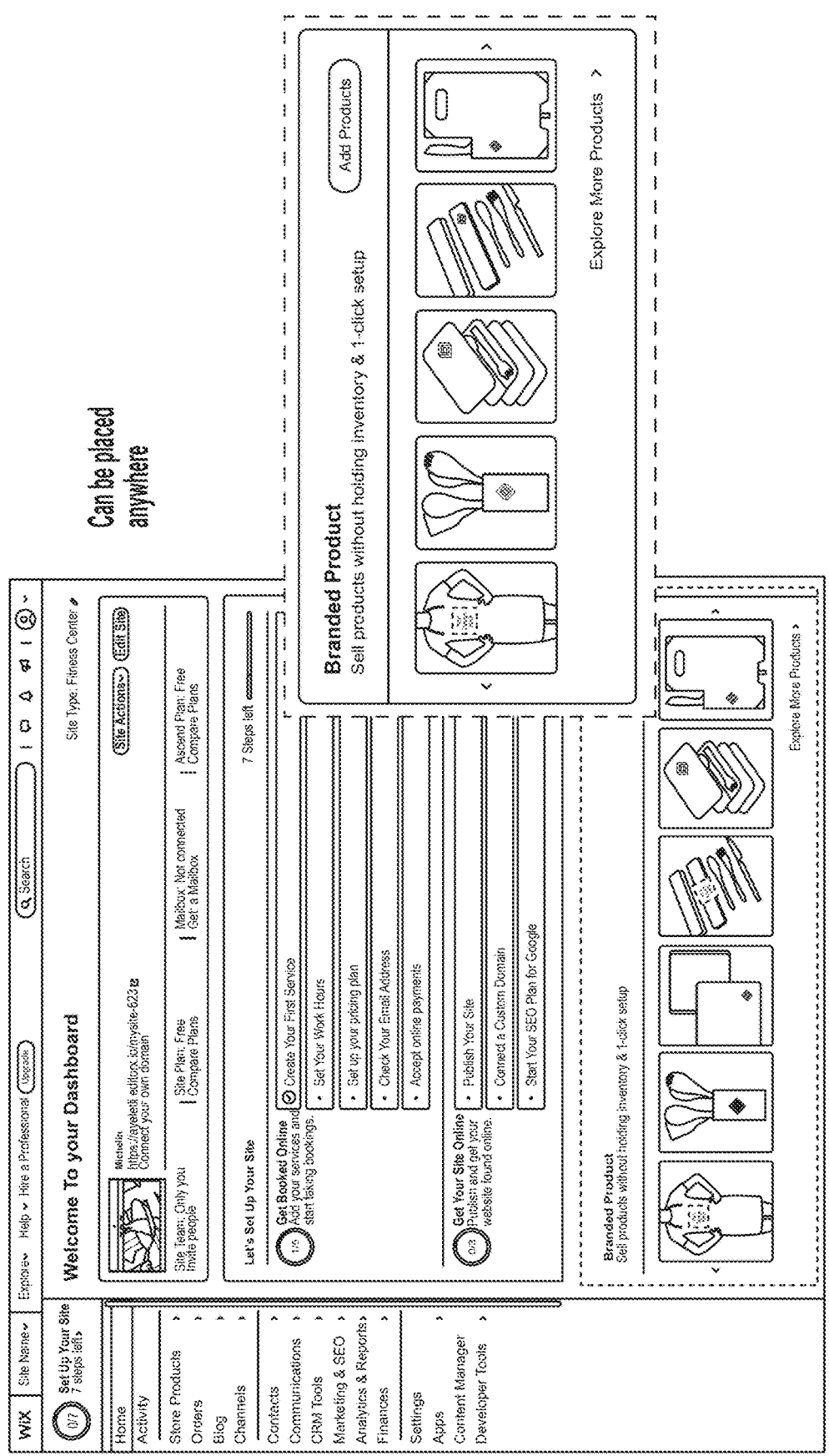

In some embodiments, the content objects widget (e.g., or products widget) enables a user to create a store filled with branded products directly associated with their business. An agnostic widget (e.g., shown in FIG. 3A) is a UI widget that can be placed anywhere across the WBS platform. The content objects widget is an agnostic widget. FIG. 3B depicts an example placement of a content objects widget in a dashboard.

The content objects widget may include a list of products created by the content object repository generator, curated for the specific user. The conte object widget may also be configured to place the logo (or text, or picture, or a sign, or anything printable) on the products automatically in real-time, dynamically making them branded products. The content objects widget may also include an interface element (e.g., button) selectable to "Explore More Products," with a list of additional products for the user. The ordering of these products is created by the content object repository generator, based on the unique user attributes. The content objects widget may also include an interface element (e.g., button) selectable to "Add Products." Products presented by the widget are exported to a user's store on the completion of the Add Products flow which is initiated by the user when clicked on the Add Products button.

Figure 3C:
Figure 3D:
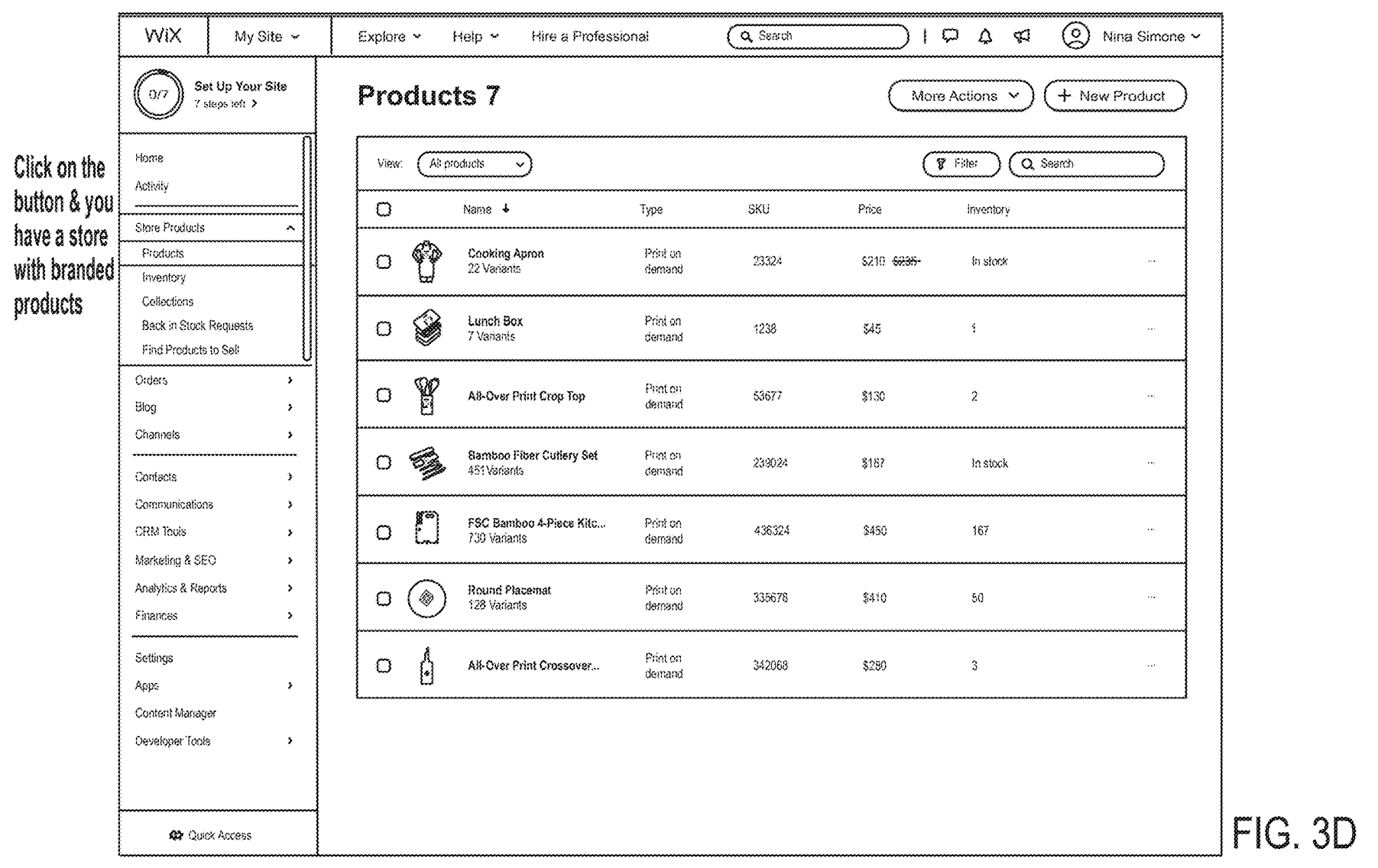

FIG. 3C depicts an example placement of a content objects widget in a "Find Products to Sell" interface or page, which is an entry point to marketplaces of dropshipping, RTS, and POD products. FIG. 3D depicts an example placement of a content objects widget in a product catalog (e.g., a custom content object repository). Products exported to a user's store via the content objects widget, they are available for sale immediately and can be managed from custom content object repository.

Figure 3E:
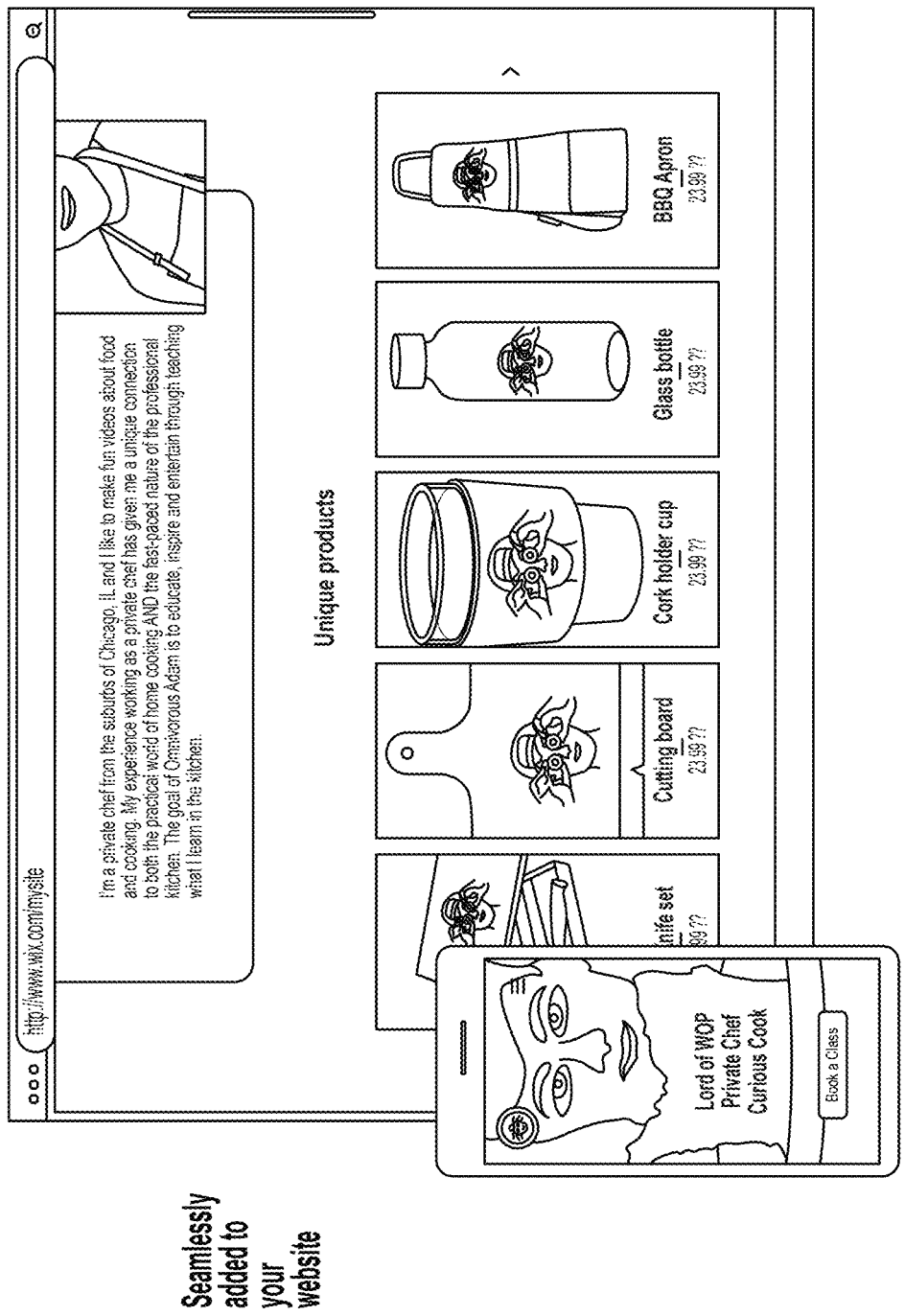
Figure 3F:
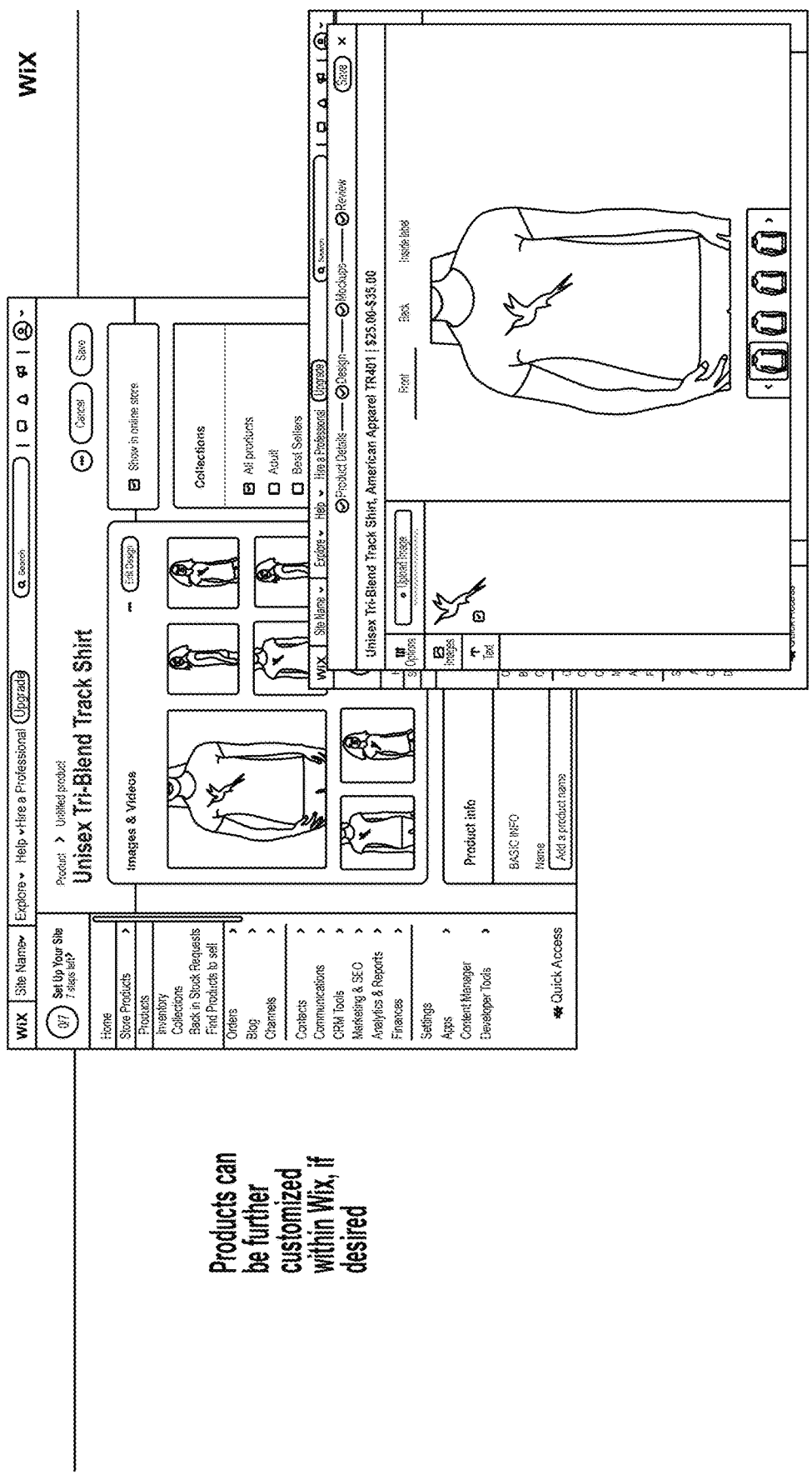
Figure 3G:
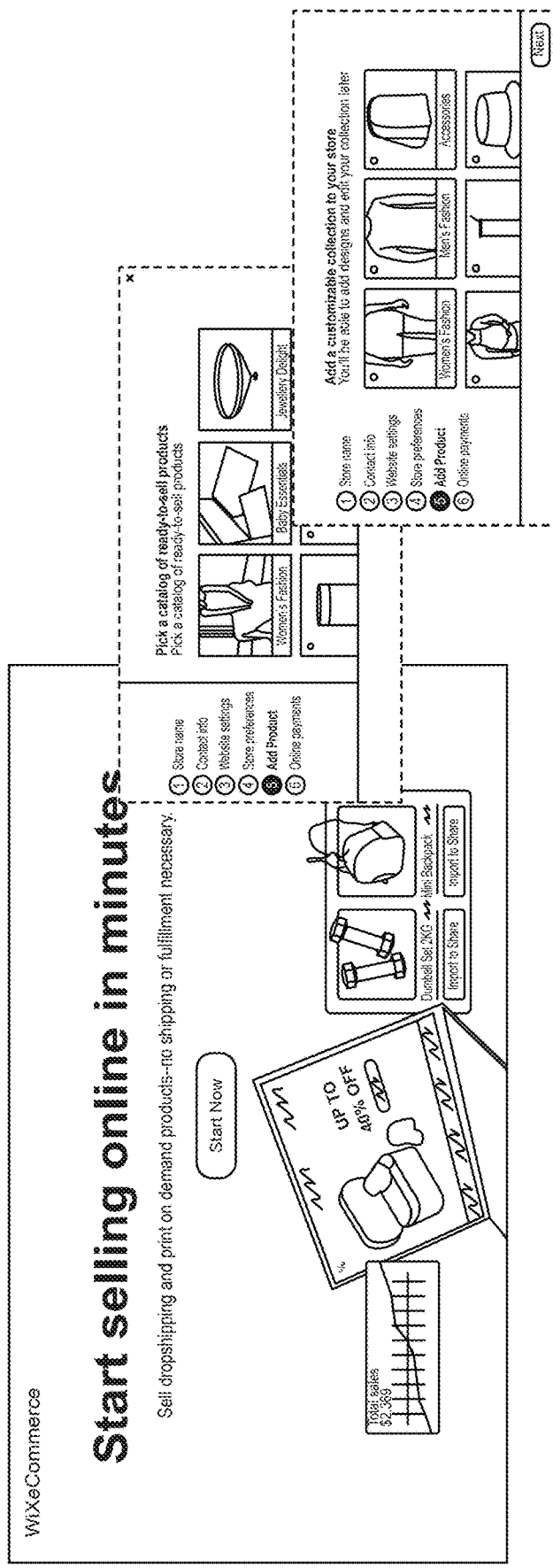

FIG. 3E depicts an example placement of a content objects widget in a storefront interface. FIG. 3F depicts an example placement of a content objects widget in a print-on-demand editor. Products exported to a storefront may be further customized using the print-on-demand editor. FIG.

Figure 3H:
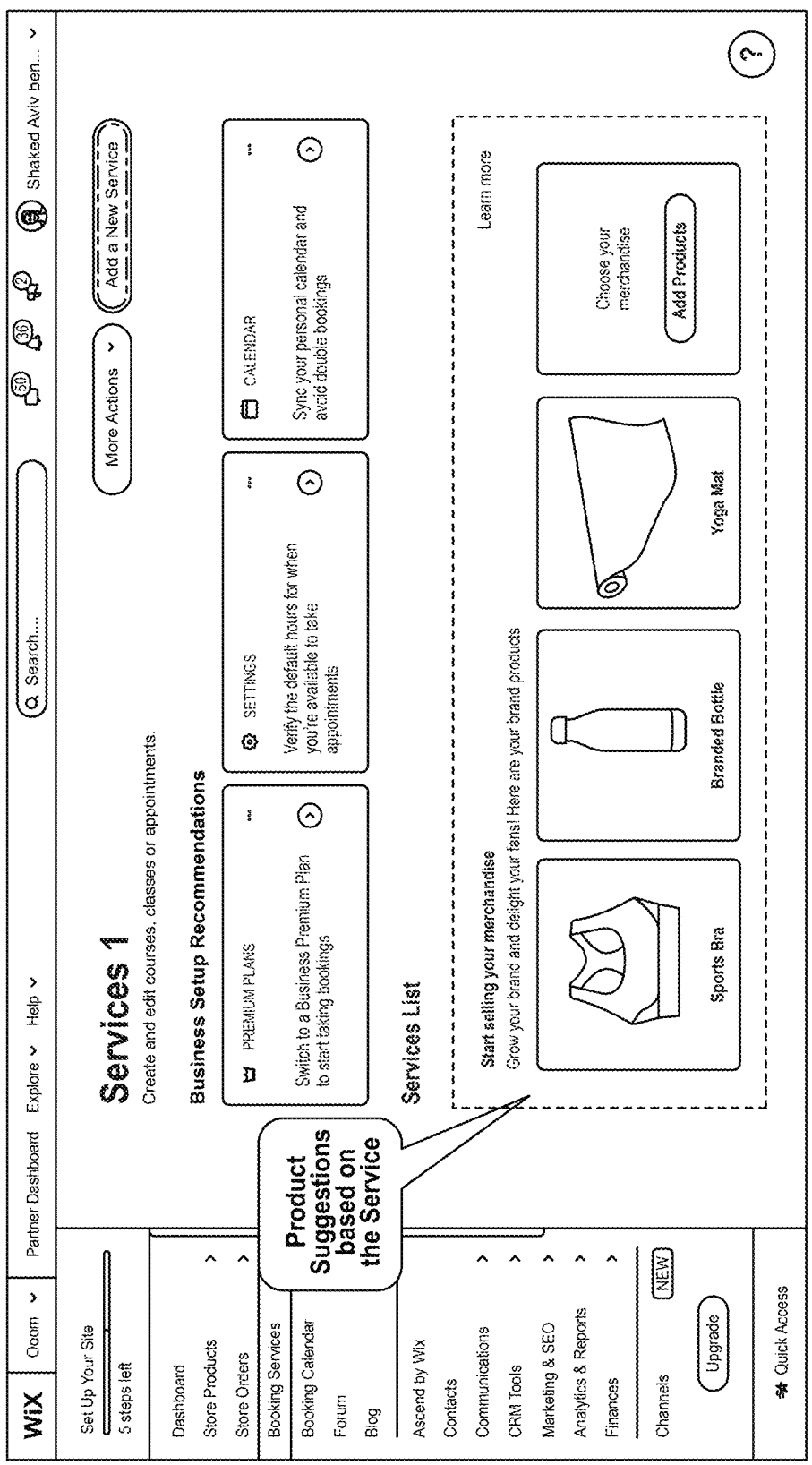
Figure 3I:
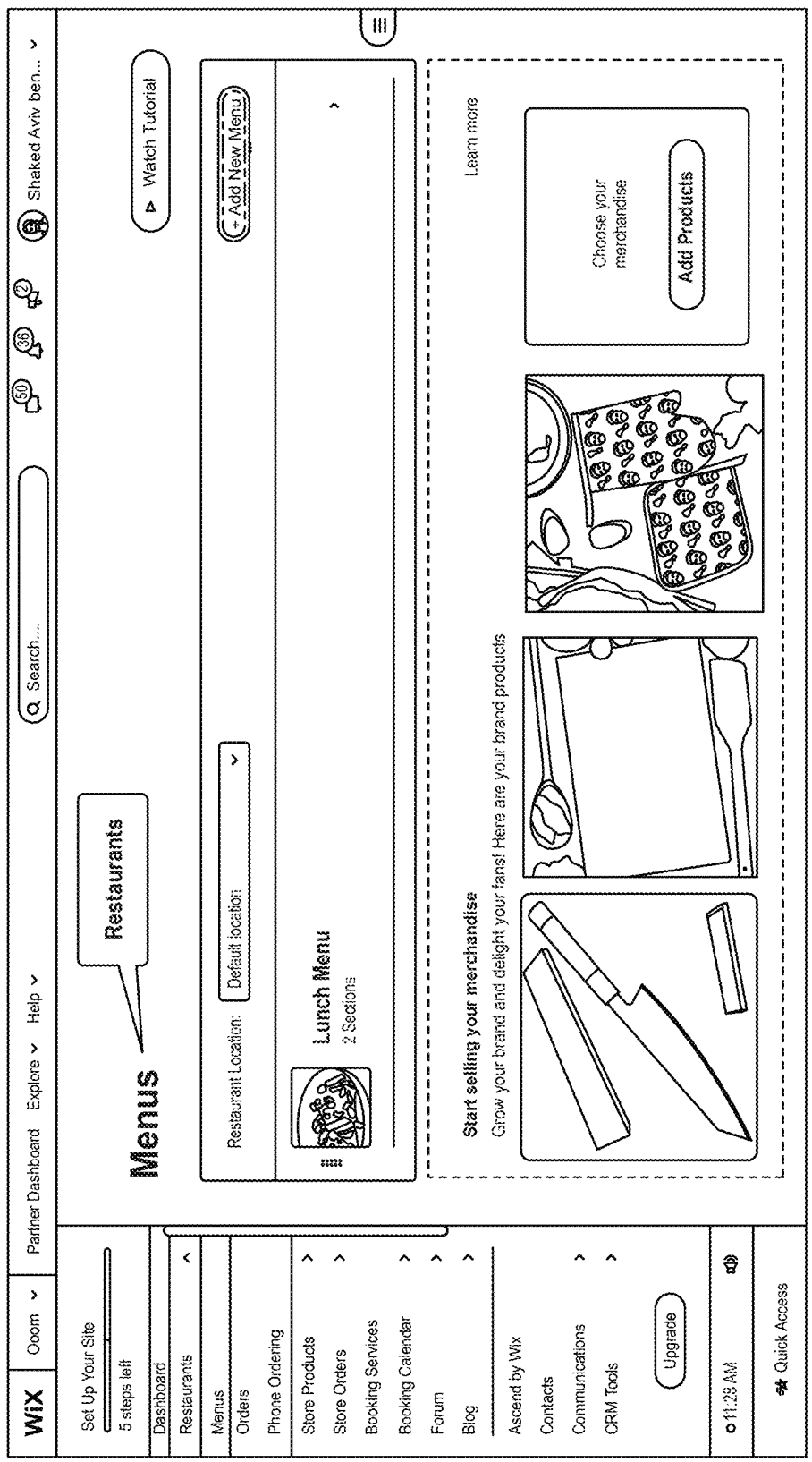
Figure 3J:
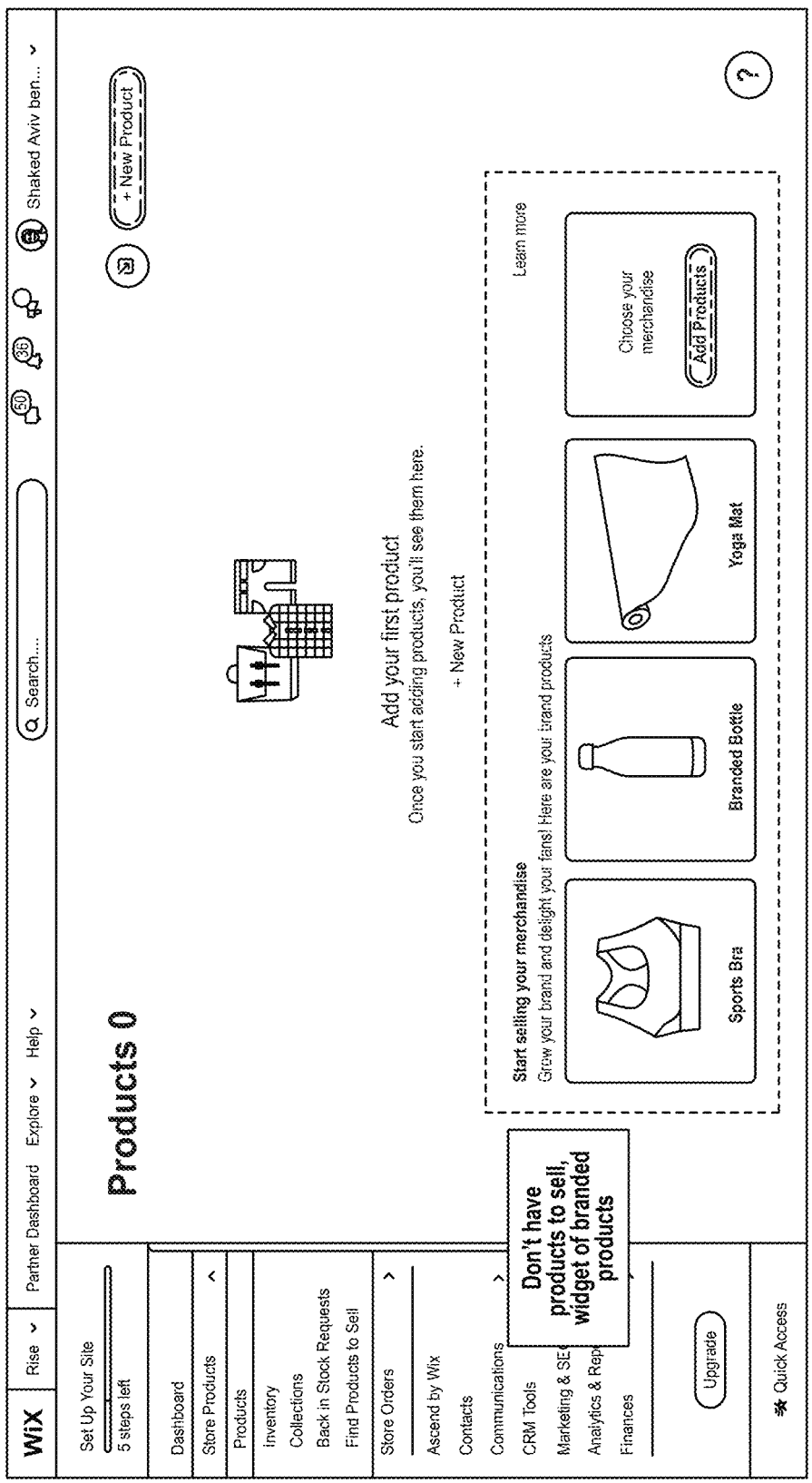
Figure 3K:
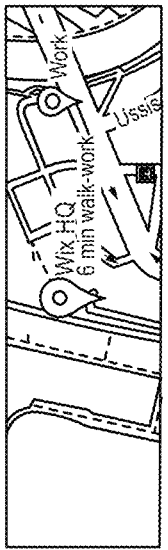

3G depicts an example placement of a content objects widget in an onboarding flow. FIG. 3H depicts an example placement of a content objects widget on a services management interface or page with products suggested based on the services provided by the website. FIG. 3I depicts an example placement of a content objects widget on a restaurant menu management interface or page. FIG. 3I depicts an example placement of a content objects widget on an empty custom content objects repository page to suggest products which the user can start selling. FIG. 3K depicts additional example interfaces in accordance with embodiments herein.

FIGS. 4A, 4B, and 4B-1 depict example operations associated with custom content object repository integration in accordance with some example embodiments described herein. That is, FIG. 4A depicts example operations associated with integration of a custom content object repository within a website such that a branded storefront is created and available. FIGS. 4B and 4B-1 depict example operations associated with personalization of a digital image on a digital image of a product using an AI mockup generator to generate context-sensitive images.

FIGS. 4C, 4C-1, and 4D depict example interfaces in accordance with some example embodiments described herein. In FIGS. 4C and 4C-1, user input including a textual description of a desired image is received (e.g., "Doraemon Super Mario Ultraman and Thor dance as a group as if they were members of Blackpink") and example images generated based on the textual description (e.g., prompt) using an AI mockup generator (e.g., using one or more trained machine learning models or generative AI models). Once an image is selected, the image can be interleaved onto images of products, resulting in custom content objects that are realistically customized. In FIG. 4D, the AI mockup generator can be used to automatically take an image or graphic and generate a realistic image of a person or product with the image or graphic incorporated as though the person or product were actually photographed with the image or graphic—without requiring such physical donning or customization.

FIGS. 5A and 5B illustrate example operations associated with custom content object repository integration in accordance with some example embodiments described herein. The operations illustrated in FIGS. 5A and 5B may, for example, be performed by a custom content object repository (CCOR) integration server 1812, which may include means, such as memory 2102, processor 2104, input/output module 2106, communications module 2108, CCOR integration module 2110, and/or the like, which are collectively configured for CCOR integration. The operations may further be performed by one or more client devices 1808A-N, which may include means, such as memory 2002, processor 2004, input/output module 2006, communications module 2008, and/or the like.

In some embodiments, shown in FIGS. 5A and 5B, at step/operation 502, a process 500 includes retrieving a website identifier associated with a website assembled based at least in part on one or more website building repositories. In some embodiments, the website identifier is selected from a plurality of website identifiers, and the website identifier is associated with an editing user identifier of the plurality of editing user identifiers.

In some embodiments, shown in FIGS. 5A and 5B, at step/operation 504, the process 500 includes generating a content object selection interface comprising a plurality of candidate content objects selected based at least in part on the website identifier and the one or more website editing historical interactions.

In some embodiments, shown in FIGS. 5A and 5B, at step/operation 506, the process 500 includes causing rendering of the content object selection interface via a first computing device associated with the editing user identifier. For example, a content object selection interface may present visualizations of multiple content objects (e.g., products) for inclusion in a content object repository (e.g., catalog) that a merchant associated with the editing user identifier desires to present via a specialized graphical user interface. It will be appreciated that the content object selection interface may include content objects for selection that are curated using one or more trained machine learning models trained based upon a corpus of website building data and other historical data available to the WBS.

In some embodiments, shown in FIGS. 5A and 5B, at step/operation 508, the process 500 includes, responsive to receiving (507), from the first computing device, selection signals indicative of one or more selected candidate content objects, transforming, using a trained customization model and based at least in part on the editing user identifier, each of the one or more selected candidate content objects into a custom contextualized content object. For example, after an editing user identifier is associated with a selection of content objects, a trained customization model can be utilized to apply one or more overlay digital images to a rendering of the content object to customize the rendering of the content object without actually having to physically customize the content object.

In some embodiments, shown in FIGS. 5A and 5B, at step/operation 510, the process 500 includes adding the custom contextualized content objects to a custom content object repository associated with the website identifier. In such a manner, a custom content object repository (e.g., smart catalog) may be rendered in association with a website identified by the website identifier.

In some embodiments the one or more website building repositories store one or more website building components and one or more website editing historical interactions associated with a plurality of editing user identifiers.

In some embodiments, the selection signals are received based on interaction via the first computing device with the content object selection interface.

In some embodiments, the custom contextualized content objects comprise contextualized digital images generated in accordance with an overlay digital image. In some embodiments, generating the contextualized digital images comprises applying the trained customization model to the overlay digital image and a selected candidate content object.

In some embodiments, the trained customization model is configured to generate the contextualized digital images such that the contextualized digital images are substantially indistinguishable from captured digital images.

In some embodiments, the trained customization model is configured to generate an overlay digital image based on applying a large language model to a natural language prompt.

In some embodiments, supplemental custom contextualized content objects are added to the custom content object repository associated with the website identifier responsive to subsequent interactions with the website identifier associated with an end user identifier. For example, embodiments herein provide for real-time (e.g., "on the fly," immediately responsive to each user interaction) modification of a website (e.g., modification of a smart catalog displayed via the website) based on a user's interaction with the website. Such modifications can be made nearly instantaneously and without regard to needing actual physical images of content objects with the overlay digital image because customization can be handled via a third-party. Moreover, the modification of the website results in realistic and contextualized images of the custom content objects such that they are substantially indistinguishable from a digital image that may have captured the custom content object.

In some embodiments, the supplemental custom contextualized content objects are added to the custom content object repository based on attributes and historical interactions associated with the end user identifier. In some embodiments, a request for fulfillment of one or more custom contextualized content objects is transmitted to a third-party application based on a selection of the one or more contextualized content objects.

Example Terminology

The term "custom content object repository" refers to a digital collection or catalog of one or more custom content objects that are stored via one or more repositories and renderable via one or more interfaces or websites of a WBS. In some embodiments, the custom content object repository comprises multiple custom content objects that are selectable via the one or more interfaces or websites, and is dynamically updatable based upon interactions with the one or more interfaces or websites performed by one or more client devices (e.g., end users). In some embodiments, a custom content object repository is a smart catalog.

The term "custom content object" refers to renderable item of digital content that is representative of physical good. In some embodiments, the custom content object is renderable via one or more interfaces or websites to provide a visualization of the physical good with an overlay digital image in such a manner that the overlay digital image appears as though it was physically attached to the physical good at the time of capture of an image of the physical good. In some embodiments, a custom content object comprises a product with a customized logo displayed thereon.

The term "content object selection interface" refers to a computing environment that is configured to display one or more interface elements representative of content objects that are available for selection via electronic interaction with the content object selection interface by one or more computing devices.

The term "candidate content object" refers to a custom content object that is made available for selection by an editing user identifier associated with a website.

The term "selection signals" refers to one or more signals representative of electronic interactions with one or more user interfaces where the one or more signals are associated with one or more selections of objects or interface elements rendered within the one or more interfaces.

The term "trained customization model" refers to a machine learning, deep learning, or other computer-implemented learning task that is trained using a corpus of data to generate one or more specific outputs. One of many examples of a trained customization model is, without limitation, an AI mockup generator. While some embodiments herein refer to an AI mockup generator, it will be appreciated that such references are for example purposes and not for the purposes of limiting the scope of a trained customization model. In some embodiments, a trained customization model is configured to generate a contextualized digital image based on an overlay digital image and a rendering of a content object. For example, the trained customization model can generate a contextualized digital image that comprises a visualization or rendering of the content object (e.g., an item) with the overlay digital image (e.g., a logo) attached to or associated with (e.g., positioned relative to) the content object such that the contextualized digital image is substantially indistinguishable to the human eye from what a captured digital image (e.g., a photograph) of the content object with the overlay digital image attached thereto would have resembled. In some embodiments, the trained customization model is applied to a candidate content object to transform the candidate content object into a custom contextualized content object, where transforming the candidate content object comprises altering a visual representation of the content object (e.g., changing pixels, etc.) to include an overlay digital image, as well as altering the visual representation along with the overlay digital image to contextually render the candidate content object with overlay digital image.

The term "custom contextualized content object" refers to one or more user interface elements configured to render a contextualized digital image such that the contextualized digital image becomes part of a repository of offerings available for selection via one or more interfaces of websites.

The term "large language model" refers to a language model configured to achieve general-purpose language understanding and generation. A large language model is trained to achieve such understanding and generation using significantly large training datasets and constantly being retrained (e.g., fine-tuned) during use. Examples of large language models are neural networks that are pre-trained using self-supervised learning and semi-supervised learning.

The term "natural language prompt" refers to natural language text describing a task that one or more trained machine learning models or large language models should perform or execute.

The term "fulfillment request" refers to physical fulfillment of customization and delivery of a physical good.

The term "third-party application" refers to an entity external to a WBS that is responsible for supplying physical goods represented by custom content objects. The third-party application may further be responsible for physically customizing the physical goods.

The term "website building tools" refers to structural objects or electronic building blocks used to assemble a website in accordance with a website building system as described herein. By way of example, website building tools may include pages, sub-pages, containers, components, atomic components, content elements, layout elements, templates, layouts, layout rules, add-on applications, third-party applications, procedural code, application programming interfaces, and the like.

The terms "website editing historical interactions," "editing historical interactions," and "historical editing interactions" refer to electronic interactions performed by client computing devices associated with editing user identifiers in the course of assembling a website in accordance with a website building system as described herein. For example, such interactions may include editing or selections of content, logic, layout, templates, elements, attributes, and/or temporal aspects of the interactions including timing between edits or selections. By way of further example, such interactions may include electronic interactions (e.g., mouse clicks, touch screen selections, cursor hovers, cursor selections, and/or the like) with website building tools, and/or temporal aspects of the interactions including timing between the electronic interactions.

The term "editing user identifier" refers to one or more items of data by which an editing user (e.g., a user building or editing a website using a website building system in accordance with embodiments herein) may be uniquely identified. For example, an editing user identifier may comprise one or more of ASCII text, encryption keys, identification certificates, a pointer, an IP address, a URL, a MAC address, a memory address, an object signature, a HASH value, or other unique identifier, or combinations thereof.

The term "website identifier" refers to one or more items of data by which a website may be uniquely identified. For example, a website identifier may comprise one or more of ASCII text, encryption keys, identification certificates, a pointer, an IP address, a URL, a MAC address, a memory address, an object signature, a HASH value, or other unique identifier, or combinations thereof.

The term "end-user data" refers to electronic interaction data associated with a plurality of end-user identifiers accessing a plurality of websites assembled in accordance with a website building system as defined herein.

The term "end-user identifier" refers to one or more items of data by which an end-user (e.g., a user accessing or interacting with a website assembled using a website building system in accordance with embodiments herein) may be uniquely identified. For example, an end-user identifier may comprise one or more of ASCII text, encryption keys, identification certificates, a pointer, an IP address, a URL, a MAC address, a memory address, an object signature, a HASH value, or other unique identifier, or combinations thereof.

The term "electronic interaction data" refers to electronic interactions performed by client devices with electronic interfaces (e.g., websites). Electronic interaction data may include interactions with a touch screen, mouse clicks, cursor positions, cursor hoverings, and the like. Electronic interaction data may further be associated with metadata, such as timestamps at a time which the electronic interaction occurred, such that the electronic interaction data includes temporal aspects.

The term "resource provider" refers to an external entity (e.g., external to a website building system) that offers resources (e.g., digital goods, virtual goods, physical goods, services, and/or the like) to end-users via a website. The resource provider may offer the resources in exchange for payment, completed via network transactions. In some examples, the resource provider offers resources via a website supported by and/or assembled using a website building system. In some examples, the resource provider is a merchant or retailer.

The term "website cluster" refers to a grouping of websites (e.g., data objects or vectors representing the websites) in such a way that websites in the same cluster are more similar (e.g., in some sense) to one another than to those websites in other website clusters. Website clusters may be generated or determined based on various website attributes associated with the websites and based on clustering analysis and/or machine learning.

The term "website attribute" refers to attributes associated with a website. In some examples, website attributes may include compliances, supported network transaction intermediaries, product similarities, transaction pattern similarities, end-user identifier device data, end-user location data, end-user registration duration, end-user status data, end-user profile attributes, end-user email address domain, end-user identifier device parameters, end-user identifier device third party application parameters, end-user identifier support history and analysis, website context, product names offered by a website, service names offered by the website, production descriptions offered by the website, service descriptions offered by the website, visual data associated with products or services offered by the website, and/or the like.

The term "similarity measure" refers to one or more items of data that quantify the similarity between two objects. In some examples, a similarity measure based on a distance metric or is an inverse of a distance metric (e.g., they take on large values for similar objects and either zero or a negative value for very dissimilar objects, or vice versa). Examples of functions for generating similarity measures include cosine similarity or RBF kernel functions.

The term "website assembly touch point data" refers to one or more items of data associated with electronic assembly interactions performed by a client computing entity associated with an editing user identifier. In some examples, website assembly touch point data includes a plurality of website assembly touch point data records each associated with a touch point and a timestamp. A touch point may be a step or landing page associated with building a website via a website building system. A touch point data record may be a data structure containing a touch point identifier (e.g., one or more items of data by which a touch point may be uniquely identified) and associated with a timestamp (e.g., an indication of network time at which an editing user identifier interacted with the touch point represented by the touch point identifier).

The term "editing user vector" refers to a data structure having multiple records (e.g., also data structures) storing data representative of an editing user and a plurality of features representative of a plurality of website assembly touch point data records associated with the editing user (e.g., also can be associated with or store an editing user identifier).

The term "website vector" refers to a data structure having multiple website records (e.g., also data structures) storing data representative of and associated with a website.

The terms "trained machine learning model," "machine learning model," "model," or "one or more models" refer to a machine learning or deep learning task or mechanism. Machine learning is a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network). In some embodiments, the model can be trained and/or trained in real-time (e.g., online training) while in use.

The machine learning models, one or more models, trained machine learning models, legitimacy prediction models, improper dispute prediction models, resource volume prediction models, and disputed network transaction prediction models as described above may make use of multiple ML engines, e.g., for analysis, recommendation generating, transformation, and other needs.

The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models are known in the art and are typically some form of neural network. The term refers to the ability of systems to recognize patterns on the basis of existing algorithms and data sets to provide solution concepts. The more they are trained, the greater knowledge they develop.

The underlying ML models may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders, transformer-based), models combining planning with other models (e.g., PDDL-based), or Generative models (e.g., GANs, diffusion-based models).

Alternatively, ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks, diffusion-based or autoencoders) to generate definitions and elements.

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein.

In various embodiments and when appropriate for the particular task, one or more of the ML models may be implemented with rule-based systems, such as an expert system or a hybrid intelligent system that incorporates multiple AI techniques.

A rule-based system is used to store and manipulate knowledge to interpret information in a useful way. It is often used in artificial intelligence applications and research. Rule-based systems constructed using automatic rule inference, such as rule-based machine learning, may be included in this system type. An example a rule-based system is a domain-specific expert system that uses rules to make deductions or choices. For example, an expert system might help a doctor choose the correct diagnosis based on a cluster of symptoms, or select tactical moves to play a game. Rule-based systems can be used to perform lexical analysis to compile or interpret computer programs, or in natural language processing. Rule-based programming attempts to derive execution instructions from a starting set of data and rules.

A hybrid intelligent system employs, in parallel, a combination of methods and techniques from artificial intelligence subfields, such as: Neuro-symbolic systems; Neuro-fuzzy systems; Hybrid connectionist-symbolic models; Fuzzy expert systems; Connectionist expert systems; Evolutionary neural networks; Genetic fuzzy systems; Rough fuzzy hybridization; and/or Reinforcement learning with fuzzy, neural, or evolutionary methods as well as symbolic reasoning methods.

An example hybrid is a hierarchical control system in which the lowest, reactive layers are sub-symbolic. The higher layers, having relaxed time constraints, are capable of reasoning from an abstract world model and performing planning. Intelligent systems usually rely on hybrid reasoning processes, which include induction, deduction, abduction and reasoning by analogy.

The terms "client device," "computing device," "user device," "client computing entity" and the like may be used interchangeably to refer to computer hardware that is configured (either physically or by the execution of software) to access one or more of an application, service, or repository made available by a server and, among various other functions, is configured to directly, or indirectly, transmit and receive data. The server is often (but not always) on another computer system, in which case the client device accesses the service by way of a network.

Example client devices include, without limitation, smartphones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user.

The terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization, or other physical properties transmitted through the transmission media.

Examples of non-transitory computer-readable media include a magnetic computer-readable medium (e.g., a floppy disk, hard disk, magnetic tape, or any other magnetic medium), an optical computer-readable medium (e.g., a compact disc read-only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer may read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application may run on a server or group of servers (e.g., physical or virtual servers in a cloud-based computing environment). In certain embodiments, an application is designed for use by and interaction with one or more local, networked or remote computing devices, such as, but not limited to, client devices. Non-limiting examples of an application comprise website editing services, document editing services, word processors, spreadsheet applications, accounting applications, web browsers, email clients, media players, file viewers, collaborative document management services, videogames, audio-video conferencing, and photo/video editors.

In some embodiments, an application is a cloud product. When associated with a client device, such as a mobile device, communication with hardware and software modules executing outside of the application is typically provided via application programming interfaces (APIs) provided by the mobile device operating system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of qualitative assessment or quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present disclosure and may be included in more than one embodiment of the present disclosure (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items. In some embodiments, a "set" may refer to a data structure or a construct having zero items such that it is an empty set.

The term "or" is used herein in both the alternative and conjunctive sense, unless otherwise indicated.

Having set forth a series of definitions called-upon throughout this application, an example system architecture and example apparatus are described below for implementing example embodiments and features of the present disclosure.

Example Computing Systems, Methods, and Apparatuses of the Disclosure

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still, further, example embodiments may be embodied by any of a variety of mobile devices, such as a portable digital assistant (PDA), mobile telephone, smartphone, laptop computer, tablet computer, wearable, or any combination of the aforementioned devices.

FIG. 6 illustrates a block diagram of an example system that may be specially configured within which embodiments of the present disclosure may operate. In this regard, FIG. 18 illustrates an overview of a computing system 1800 which may include one or more devices and sub-systems that are configured for performing some or all of the various operations and processes described herein. In some examples, such a system 1800 implements custom content object repository (CCOR) integration within a WBS via a CCOR integration system 1810 in accordance with some embodiments described herein.

The computing system 1800 is illustrated with an CCOR integration system 1810 communicably connected via a network 1802 to one or more client devices 1808A, 1808B, ... 1808N (referred to as "client devices 1808"; the depictions in FIG. 18 of "N" client devices are merely for illustration purposes). Said differently, users may access the CCOR integration system 1810 over at least one communications network 1802 using one or more of client devices 1808. In some embodiments, each of the client devices 1808A-N is embodied by one or more user-facing computing devices embodied in hardware, software, firmware, and/or a combination thereof, configured for performing some or all of the CCOR integration system functionality described herein. That is, the client devices 1808A-N may include circuitry, modules, networked processors, a suitable network server, and/or other types of processing device (e.g., a controller or computing device of the client device 1808). For example, in some embodiments, a client device 1808A-N is embodied by a personal computer, a desktop computer, a laptop computer, a computing terminal, a smartphone, a netbook, a tablet computer, a personal digital assistant, a wearable device, a smart home device, and/or other networked devices that may be used for any suitable purpose in addition to performing some or all of the CCOR integration system functionality described herein. In some example contexts, the client device 1808A-N is configured to execute one or more computing programs to perform the various functionality described herein. For example, the client device 1808A-N may execute a web-based application or applet (e.g., accessible via a website), a software application installed to the client device 1808A-N (e.g., an "app"), or other computer-coded instructions accessible to the client device 1808.

In some embodiments, the client devices 1808A-N may include various hardware, software, firmware, and/or the like for interfacing with the CCOR integration system 1810. Said differently, a client device 1808A-N may be configured to access the CCOR integration system 1810 and/or to render information provided by the CCOR integration system 1810 (e.g., via a software application executed on the client device 1808). According to some embodiments, the client device 1808A-N comprises a display for rendering various interfaces. For example, in some embodiments, the client device 1808A-N is configured to display such interface(s) on the display of the client device 1808A-N for viewing, editing, and/or otherwise interacting with at least a selected component, which may be provided by the CCOR integration system 1810.

In some embodiments, the CCOR integration system 1810 includes one or more servers, such as CCOR integration server 1812. In some embodiments, the CCOR integration system 1810 comprises other servers and components, as described below with respect to the exemplary depicted embodiment of a website building system 1910 in FIG. 7.

CCOR integration server 1812 may be any suitable network server and/or other type of processing device. In this regard, the CCOR integration server 1812 may be embodied by any of a variety of devices, for example, the CCOR integration server 1812 may be embodied as a computer or a plurality of computers. For example, CCOR integration server 1812 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least a portion of the components illustrated with respect to server apparatus 2100 in FIG. 9 and described in connection therewith. The CCOR integration server 1812 may, in some embodiments, comprise several servers or computing devices performing interconnected and/or distributed functions. Despite the many arrangements contemplated herein, CCOR integration server 1812 is shown and described herein as a single computing device to avoid unnecessarily overcomplicating the disclosure.

In some embodiments, the CCOR integration server 1812 is configured, via one or more software modules, hardware modules, or a combination thereof, to access communications network 1802 for communicating with one or more of the client devices 1808. Additionally or alternatively, the CCOR integration server 1812 is configured, via software, hardware, or a combination thereof, to is configured to execute any of a myriad of processes associated with the implementing CCOR integration. Said differently, CCOR integration server 1812 may include circuitry, modules, networked processors, or the like, configured to perform some or all of the CCOR integration functionality, as described herein. In this regard, for example, in some embodiments, the CCOR integration server 1812 receives and processes data. For example, the client devices 1808A-N and/or an application may communicate with the CCOR integration system 1810 (e.g., CCOR integration server 1812) via one or more application programming interfaces (APIs), web interfaces, web services, or the like.

In some embodiments, the CCOR integration system 1810 includes at least one repository, such as repository 1814. Such repository(ies) may be hosted by the CCOR integration server 1812 or otherwise hosted by devices in communication with the CCOR integration server 1812. As depicted, in some embodiments, the CCOR integration server 1812 is communicably coupled with the repository 1814. In some embodiments, the CCOR integration server 1812 may be located remotely from repository 1814. In this regard, in some embodiments, the CCOR integration server 1812 is directly coupled to repository 1814 within the CCOR integration system 1810.

Alternatively or additionally, in some embodiments, the CCOR integration server 1812 is wirelessly coupled to the repository 1814. In yet other embodiments, the repository 1814 is embodied as a sub-system(s) of the CCOR integration server 1812. That is, the CCOR integration server 1812 may comprise repository 1814. Alternatively or additionally, in some embodiments, the repository 1814 is embodied as a virtual repository executing on the CCOR integration server 1812.

The repository 1814 may be embodied by hardware, software, or a combination thereof, for storing, generating, and/or retrieving data and information utilized by the CCOR integration system 1810 for performing the operations described herein. The repository 1814, in some embodiments, may comprise an object repository, a structured repository, a semi-structured repository, or a non-structured repository. For example, repository 1814 may be stored by any suitable storage device configured to store some or all of the information described herein (e.g., memory 2102 of the CCOR integration server 1812 or a separate memory system separate from the CCOR integration server 1812, such as one or more database systems, backend data servers, network databases, cloud storage devices, or the like provided by another device (e.g., online application or 3rd party provider), such as a Network Attached Storage (NAS) device or devices, or as a separate database server or servers). Repository 1814 may comprise data received from the CCOR integration server 1812 (e.g., via a memory 2102 and/or processor(s) 2104) and/or a client device 1808, and the corresponding storage device may thus store this data. The repository 1814 may store various data in any of a myriad of manners, formats, tables, computing devices, and/or the like. For example, in some embodiments, the repository 1814 includes one or more sub-repositories that are configured to store specific data processed by the CCOR integration system 1810. Repository 1814 includes information accessed and stored by the CCOR integration server 1812 to facilitate the operations of the CCOR integration system 1810.

CCOR integration system 1810 (e.g., CCOR integration server 1812) may communicate with one or more client devices 1808A-N via communications network 1802. Communications network 1802 may include any one or more wired and/or wireless communication networks including, for example, a wired or wireless local area network (LAN), personal area network (PAN), metropolitan area network (MAN), wide area network (WAN), or the like, or combinations thereof, as well as any hardware, software and/or firmware required for implementing the one or more networks (e.g., network routers, switches, hubs, etc.). For example, communications network 1802 may include a cellular telephone, mobile broadband, long-term evolution (LTE), GSM/EDGE, UMTS/HSPA, IEEE 802.11, IEEE 802.16, IEEE 802.20, Wi-Fi, dial-up, and/or WiMAX network.

Furthermore, the communications network 1802 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the CCOR integration system 1810, such as JavaScript Object Notation (JSON) objects sent via a WebSocket channel. In some embodiments, the protocol is JSON over RPC, JSON over REST/HTTP, the like, or combinations thereof.

In some embodiments, the CCOR integration system 1810 is a standalone system. In other embodiments, the CCOR integration system 1810 is embedded inside a larger editing system. For example, in certain embodiments, the CCOR integration system 1810 is associated with a visual design system and further still, in some embodiments, the visual design system is one or more of a document building system, a website building system, or an application building system.

An example of an CCOR integration system (e.g., CCOR integration system 1810 as depicted in FIG. 6) is depicted in FIG. 7. In particular, FIG. 7 depicts a computing system 1900 including a website building system ("WBS") 1910 as an example CCOR integration system for the creation and/or update of, for example, hierarchical websites.

A WBS 1910 may be online (e.g., applications are edited and stored on a server or server set), off-line, or partially online (with web sites being edited locally but uploaded to a central server for publishing). A WBS 1910 may be accessed by a variety of users via a network 1902, including designers, subscribers, subscribing users or site editors, and code editors, which are the users designing the web sites, as well as end users which are the "users of users" accessing the created web sites. Although end users may typically access the WBS 1910 in a read-only mode, a WBS (and web sites) may allow end users to perform changes to a web site, such as adding or editing data records, adding talkbacks to news articles, adding blog entries to blogs, and/or the like.

In some embodiments, a WBS 1910 may allow multiple levels of users and different permissions and capabilities may be associated with and/or assigned to each level. For example, users may register with the WBS 1910 (e.g., via the WBS server which manages the users, web sites, and access parameters of the end users).

With reference to FIG. 7, in addition to an CCOR integration service 1912, and a repository 1914, a WBS 1910 may comprise a WBS site manager 1905, an object marketplace 1915, a RT (runtime) server 1920, a WBS editor 1930, a site generation system 1940 and a WBS content management system 2000. WBS 1910 is depicted in communication with embodiments of the client devices 1808A-N which are depicted as being operated by WBS vendor staff 1908A, WBS site designer 1908B (e.g., a user), a site viewer 1908N (e.g., a user of a user), as well as external systems 1970. For example, WBS vendor staff 1908A may be an employee of the pertinent website building system vendor and may create and maintain various WBS elements such as templates, content/layout elements, and/or the like. In some embodiments, a site designer 1908B may use WBS 1910 to build his site for use by site viewers 1908N.

Additionally or alternatively, a site designer 1908B may be an external site designer or consultant, though the website building system vendor may employ site designers 1908B, for example for the creation of template sites for inclusion in the WBS 1910. In some embodiments, site viewers 1908N may only view the system. Additionally or alternatively, in some embodiments, site viewers 1908N may be allowed some form of site input or editing (e.g., talkback sending or blog article posting). In still further embodiments, WBS 1910 comprises a limited site generation system 1940 configured to allow a viewer 1908N to build (e.g., a user page) within a social networking site. It is contemplated by this disclosure that a site viewer 1908N may also include a site designer 1908B.

In some embodiments, WBS site manager 1905 is used by site designer 1908B to manage his created sites (e.g., to handle payment for the site hosting or set permissions for site access). In some embodiments, WBS RT (runtime) server 1920 handles run-time access by one or more (e.g., possibly numerous) site viewers 1908N. In some embodiments, such access is read-only, but in certain embodiments, such access involves interactions that may affect back-end data or front-end display (e.g., purchasing a product or posting a comment in a blog). In some embodiments, WBS RT server 1920 serves pages to site designers 1908B (e.g., when previewing the site, or as a front-end to WBS editor 1930).

In some embodiments, object marketplace 1915 allows trading of objects (e.g., as add-on applications, templates, and element types) between object vendors and site designers 1908B through WBS 1910. In some embodiments, WBS editor 1930 allows site designer 1908B to edit site pages (e.g., manually or automatically generated), such as editing content, logic, layout, attributes, and/or the like. For example, in some embodiments, WBS editor 1930 allows site designer 1908B to adapt a particular template and its elements according to his business or industry.

In some embodiments, site generation system 1940 creates the actual site based on the integration and analysis of information entered by site designer 1908B (e.g., via questionnaires), pre-specified and stored in content management system 2000 together with information from external systems 1970 and internal information held within CMS 2000 that may be gleaned from the use of the WBS 1910 by other designers. Additionally or alternatively, CMS 2000 is held in centralized storage or locally by site designer 1908B. Example repositories of a CMS 2000 are described below with respect to FIG. 8.

With reference to FIG. 8, an example CMS 2000 is illustrated. The WBS 1910 may utilize a CMS 2000, comprising a series of repositories, stored over one or more servers or server farms, to support the creation of various websites. For example, CMS 2000 may include one or more of user information/profile repository 2012, WBS component repository 2016, WBS site repository 2009, business intelligence (BI) repository 2010, and editing history repository 2011. Additionally or alternatively, CMS 2000 may include one or more of questionnaire type repository 2001, content element (CE) type repository 2002, LE (layout element) type repository 2003, design kit repository 2004, filled questionnaires repository 2005, CER (content element repository) 2006, LER (layout element repository) 2007, layout selection store 2008, rules repository 2013, family/industry repository 2014, and ML/AI (machine learning/artificial intelligence) repository 2015. A CMS 2000 may also include a CMS coordinator 2017 to coordinate and control access to such one or more repositories.

It is contemplated by this disclosure that the WBS 1910 may be used to create and/or update hierarchical websites based on visual editing or automatic generation based on collected business knowledge, where collected business knowledge refers to the collection of relevant content to the web site being created which may be gleaned from, for example, external systems 670 or other sources. Further details regarding collected business knowledge are described in commonly-owned U.S. Pat. No. 10,073,923 which was filed May 29, 2017 as U.S. patent application Ser. No. 15/607,586, and is entitled "SYSTEM AND METHOD FOR THE CREATION AND UPDATE OF HIERARCHICAL WEBSITES BASED ON COLLECTED BUSINESS KNOWLEDGE," which application is incorporated by reference herein in its entirety.

In some embodiments, WBS 1910 uses internal data architecture to store WBS-based sites. For example, this architecture may organize the handled sites' internal data and elements inside the WBS 1910. This architecture may be different from the external view of the site (as seen, for example, by the end-users) and may also be different from the way the corresponding HTML pages sent to the browser are organized. For example, in some embodiments, the internal data architecture contains additional properties for each element in the page (e.g., creator, creation time, access permissions, link to templates, SEO-related information, and/or the like) that are relevant for the editing and maintenance of the site in the WBS 1910 but are not externally visible to end-users (or even to some editing users). The internal version of the sites may be stored in a site repository as further detailed below.

In some embodiments, a WBS 1910 is used with applications. For example, a visual application is a website including pages, containers, and components. Each page is separately displayed and includes one or more components. In some embodiments, components include containers as well as atomic components. In some embodiments, the WBS 1910 supports hierarchical arrangements of components using atomic components (e.g., text, image, shape, video, and/or the like) as well as various types of container components which contain other components (e.g., regular containers, single-page containers, multi-page containers, gallery containers, and/or the like). The sub-pages contained inside a container component are referred to as mini-pages, each of which may contain multiple components. Some container components may display just one of the mini-pages at a time, while others may display multiple mini-pages simultaneously.

In some examples, pages may use templates—general page templates or component templates. In an exemplary embodiment, an application master page containing components replicated in all other regular pages is a template. In another exemplary embodiments, an application header/footer, which repeats on all pages, is a template. In some embodiments, templates may be used for the complete page or page sections. A WBS 1910 may provide inheritance between templates, pages or components, possibly including multi-level inheritance, multiple inheritance and diamond inheritance (e.g., A inherits from B and C, and both B and C inherit from D). In some embodiments, a WBS 1910 supports site templates.

In some embodiments, the visual arrangement of components inside a page is a layout. In some embodiments, a WBS 1910 supports dynamic layout processing whereby the editing of a given component (or other changes affecting it such as externally-driven content change) may affect other components. Further details regarding dynamic layout processing are described in commonly-owned U.S. Pat. No. 10,185,703, which was filed Feb. 20, 2013 as U.S. patent application Ser. No. 13/771,119, and is entitled "WEB SITE DESIGN SYSTEM INTEGRATING DYNAMIC LAYOUT AND DYNAMIC CONTENT," which patent is incorporated by reference herein in its entirety.

In some embodiments, a WBS 1910 is extended using add-on applications, such as third-party applications and components, list applications, and WBS configurable applications. In certain embodiments, such add-on applications may be added and integrated into designed web sites. Such add-on applications may be purchased (or otherwise acquired) through a number of distribution mechanisms, such as being pre-included in the WBS design environment, from an application store (e.g., integrated into the WBS object marketplace 1915 or external) or directly from the third-party vendor. Such third-party applications may be hosted on the servers of the WBS vendor, the servers of the third-party application's vendor, and/or a 4th party server infrastructure.

In some embodiments, a WBS 1910 allows procedural code to be added to some or all of the entities (e.g., applications, pages, elements, components, and the like). Such code could be written in a standard language (such as JavaScript), an extended version of a standard language or a language proprietary to the specific WBS 1910. The executed code may reference APIs provided by the WBS 1910 itself or external providers. The code may also reference internal constructs and objects of the WBS 1910, such as pages, components and their attributes.

In some embodiments, the procedural code elements may be activated via event triggers which may be associated with user activities (e.g., mouse move or click, page transition and/or the like), activities associated with other users (e.g., an underlying database or a specific database record being updated by another user and/or the like), system events or other types of conditions. The activated code may be executed inside the WBS's client element (e.g., client devices 1808), the server platform, a combination of the two or a dynamically determined execution platform. Further details regarding activation of customized back-end functionality are described in commonly-owned U.S. Pat. No. 10,209,966, which was filed on Jul. 24, 2018 as U.S. patent application Ser. No. 16/044,461, and is entitled "CUSTOM BACK-END FUNCTIONALITY IN AN ONLINE WEBSITE BUILDING ENVIRONMENT," which patent is incorporated by reference herein in its entirety.

FIG. 9 illustrates a block diagram of an example apparatus that may be specially configured in accordance with an example embodiment of the present disclosure. In some embodiments, CCOR integration system 1810 and/or CCOR integration server 1812 is embodied by one or more computing systems, such as the apparatus 2100 as depicted and described in FIG. 9.

FIG. 9 shows a schematic block diagram of example modules or circuitry, some or all of which may be included in server apparatus 2100. As illustrated in FIG. 9, in accordance with some example embodiments, the server apparatus 2100 may include various means, such as memory 2102, processor 2104, input/output module 2106, communications module 2108, and/or CCOR integration module 2110. The server apparatus 2100 may be configured, using one or more of the modules 2102-2110, to execute the operations regarding implementing CCOR integration functionality with respect to FIGS. 1-8. Said differently, systems, methods, apparatuses, and/or computer program products as described herein are configured to transform or otherwise manipulate a general-purpose computer(s) so that it functions as a special-purpose computer to provide CCOR integration as described herein.

Although the use of the terms "module" and "circuitry" as used herein with respect to components 2102-2110 are described in some cases using functional language, it should be understood that the particular implementations necessarily include the use of particular hardware configured to perform the functions associated with the respective module or circuitry as described herein. It should also be understood that certain of these components 2102-2110 may include similar or common hardware. For example, two or more modules may both leverage use of the same processor, network interface, storage medium, or the like to perform their associated functions, such that duplicate hardware is not required for each module. It will be understood in this regard that some of the components or modules described in connection with the CCOR integration server 1812, for example, may be housed within this device, while other components or modules are housed within another of these devices, or by yet another device not expressly illustrated in FIG. 9. Said differently, in some embodiments, one or more external systems (such as a remote cloud computing and/or data storage system) may also be leveraged to provide at least some of the functionality discussed herein.

While the terms "module" and "circuitry" should be understood broadly to include hardware, in some embodiments, the terms "module" and "circuitry" also include software for configuring the hardware. That is, in some embodiments, each of the modules 2102-2110 may be embodied by hardware, software, or a combination thereof, for performing the operations described herein. In some embodiments, some of the modules 2102-2110 may be embodied entirely in hardware or entirely in software, while other modules are embodied by a combination of hardware and software. For example, in some embodiments, the terms "module" and "circuitry" may include processing circuitry, storage media, network interfaces, input/output devices, and the like. In some embodiments, other elements of the server apparatus 2100 may provide or supplement the functionality of a particular module or circuitry. For example, the processor 2104 may provide processing functionality, the memory 2102 may provide storage functionality, the communications module 2108 may provide network interface functionality, and the like.

In some embodiments, one or more of the modules 2102-2110 may share hardware, to eliminate duplicate hardware requirements. Additionally or alternatively, in some embodiments, one or more of the modules 2102-2110 may be combined, such that a single module includes means configured to perform the operations of two or more of the modules 2102-2110. Additionally or alternatively, one or more of the modules 2102-2110 may be embodied by two or more submodules.

In some embodiments, the processor 2104 (and/or co-processor or any other processing circuitry assisting or otherwise associated with the processor) may be in communication with the memory 2102 via a bus for passing information among components of, for example, CCOR integration server 1812. The memory 2102 is non-transitory and may include, for example, one or more volatile and/or non-volatile memories, or some combination thereof. In other words, for example, the memory 2102 may be an electronic storage device (e.g., a non-transitory computer readable storage medium). The memory 2102 may be configured to store information, data, content, applications, instructions, or the like, for enabling server apparatus 2100 (e.g., CCOR integration server 1812) to carry out various functions in accordance with example embodiments of the present disclosure.

Although illustrated in FIG. 9 as a single memory, memory 2102 may comprise a plurality of memory components. The plurality of memory components may be embodied on a single computing device or distributed across a plurality of computing devices. In various embodiments, memory 2102 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2102 may be configured to store information, data, applications, instructions, or the like for enabling server apparatus 2100 to carry out various functions in accordance with example embodiments discussed herein. For example, in at least some embodiments, memory 2102 is configured to buffer data for processing by processor 2104. Additionally or alternatively, in at least some embodiments, memory 2102 is configured to store program instructions for execution by processor 2104. Memory 2102 may store information in the form of static and/or dynamic information. This stored information may be stored and/or used by the server apparatus 2100 (e.g., CCOR integration server 1812) during the course of performing its functionalities.

Processor 2104 may be embodied in a number of different ways and may, for example, include one or more processing devices configured to perform independently. Additionally, or alternatively, processor 2104 may include one or more processors configured in tandem via a bus to enable independent execution of instructions, pipelining, and/or multi-threading. Processor 2104 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 9 as a single processor, in some embodiments, processor 804 comprises a plurality of processors. The plurality of processors may be embodied on a single computing device or may be distributed across a plurality of such devices collectively configured to function as CCOR integration server 1812. The plurality of processors may be in operative communication with each other and may be collectively configured to perform one or more functionalities of CCOR integration server 1812 as described herein.

In an example embodiment, processor 2104 is configured to execute instructions stored in the memory 2102 or otherwise accessible to processor 2104. Alternatively, or additionally, the processor 2104 may be configured to execute hard-coded functionality. As such, whether configured by hardware or software methods, or by a combination thereof, the processor 2104 may represent an entity (e.g., physically embodied in circuitry) capable of performing operations according to an embodiment of the present disclosure while configured accordingly. Alternatively, as another example, when the processor 2104 is embodied as an executor of software instructions, the instructions may specifically configure processor 2104 to perform one or more algorithms and/or operations described herein when the instructions are executed. For example, these instructions, when executed by processor 2104, may cause the server apparatus 2100 (e.g., CCOR integration server 1812) to perform one or more of the functionalities of system 1800 as described herein.

In some embodiments, the server apparatus 2100 further includes input/output module 2106 that may, in turn, be in communication with processor 2104 to provide an audible, visual, mechanical, or other output and/or, in some embodiments, to receive an indication of an input from a user, a client device 1808, or another source. In that sense, input/output module 2106 may include means for performing analog-to-digital and/or digital-to-analog data conversions. Input/output module 2106 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output module 2106 may comprise a user interface and may comprise a web user interface, a mobile application, a client device, a kiosk, or the like. The processor 2104 and/or user interface circuitry comprising the processor 2104 may be configured to control one or more functions of a display or one or more user interface elements through computer program instructions (e.g., software and/or firmware) stored on a memory accessible to the processor 2104 (e.g., memory 2102, and/or the like). In some embodiments, aspects of input/output module 2106 may be reduced as compared to embodiments where server apparatus 2100 may be implemented as an end-user machine or other type of device designed for complex user interactions. In some embodiments (like other components discussed herein), input/output module 2106 may even be eliminated from server apparatus 2100. Input/output module 2106 may be in communication with memory 2102, communications module 2108, and/or any other component(s), such as via a bus. Although more than one input/output module 2106 and/or other component may be included in server apparatus 2100, only one is shown in FIG. 9 to avoid overcomplicating the disclosure (e.g., like the other components discussed herein).

Communications module 2108, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with server apparatus 2100. In this regard, communications module 2108 may include, for example, a network interface for enabling communications with a wired or wireless communication network. For example, in some embodiments, communications module 2108 is configured to receive and/or transmit any data that may be stored by memory 2102 using any protocol that may be used for communications between computing devices. For example, communications module 2108 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications module 2108 includes circuitry for interacting with the antenna(s) to cause transmission of signals via the antenna(e) or to handle receipt of signals received via the antenna(e). These signals may be transmitted by CCOR integration server 1812 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications module 2108 may additionally or alternatively be in communication with the memory 2102, input/output module 2106 and/or any other component of server apparatus 2100, such as via a bus.

In some embodiments, CCOR integration module 2110 is included in the server apparatus 2100 and configured to perform the functionality discussed herein related to CCOR integration. In some embodiments, CCOR integration module 2110 includes hardware, software, firmware, and/or a combination of such components, configured to support various aspects of such CCOR integration-related functionality, features, and/or services of the CCOR integration module 2110 as described herein.

It should be appreciated that, in some embodiments, CCOR integration module 2110 performs one or more of such exemplary actions in combination with another module of the server apparatus 2100, such as one or more of memory 2102, processor 2104, input/output module 2106, and communications module 2108. For example, in some embodiments, CCOR integration module 2110 utilizes processing circuitry, such as the processor 2104 and/or the like, to perform one or more of its corresponding operations. In a further example, some or all of the functionality of CCOR integration module 2110 may be performed by processor 2104 in some embodiments. In this regard, some or all of the example CCOR integration processes and algorithms discussed herein may be performed by at least one processor 2104 and/or CCOR integration module 2110. It should also be appreciated that, in some embodiments, CCOR integration module 2110 may include a separate processor, specially configured field programmable gate array (FPGA), or application specific integrated circuit (ASIC) to perform its corresponding functions.

Additionally or alternatively, in some embodiments, CCOR integration module 2110 utilizes memory 2102 to store collected information. For example, in some implementations, CCOR integration module 2110 includes hardware, software, firmware, and/or a combination thereof, that interacts with repository 1914 (as illustrated in FIG. 7) and/or memory 2102 to send, retrieve, update, and/or store data values embodied by and/or associated with the CCOR integration module 2110.

FIG. 10 illustrates a block diagram of an example client apparatus that may be specially configured in accordance with an example embodiment of the present disclosure. In some embodiments, the client device 1808A, 1808B, 1808N is embodied by one or more computing systems, such as the client apparatus 2200 as depicted and described in FIG. 10. The client apparatus 2200 includes a memory 2202, processor 2204, input/output module 2206, and communications module 2208. The client apparatus 2200 may be configured using one or more of the sets of circuitry to execute the operations described herein. The modules 2202-2208 may function similarly or identically to the similarly-named modules depicted and described with respect to the server apparatus 2100. For purposes of brevity, repeated disclosure with regard to the functionality of such similarly-named sets of circuitry is omitted herein.

In some embodiments, one or more of the modules 2202-2208 are combinable. Alternatively or additionally, in some embodiments, one or more of the modules perform some or all of the functionality described associated with another component. For example, in some embodiments, one or more of the modules 2202-2208 are combined into a single module embodied in hardware, software, firmware, and/or a combination thereof.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Any operational step shown in broken lines in one or more flow diagrams illustrated herein are optional for purposes of the depicted embodiment.

In some cases, the actions recited in the claims may be performed in a different order and still achieve desirable results. In addition, the processes depicted in the accompanying figures do not necessarily require the particular order shown, or sequential order, to achieve desirable results unless described otherwise. In certain implementations, multitasking and parallel processing may be advantageous.

Accordingly, non-transitory computer-readable storage media may be configured to store firmware, one or more application programs, and/or other software, which include instructions and/or other computer-readable program code portions that may be executed to control processors of the components of server apparatus 2100 and/or client apparatus 2200 to implement various operations, including the examples shown herein. As such, a series of computer-readable program code portions may be embodied in one or more computer program products and may be used, with a device, database, and/or other programmable apparatus, to produce the machine-implemented processes discussed herein. It is also noted that all or some of the information discussed herein may be based on data that is received, generated and/or maintained by one or more components of the CCOR integration server 1812 and/or client device 1808. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of CCOR integration server 1812 and client device 1808.

The computing systems described herein may include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device may be received from the client device at the server.

The following example embodiments are provided, the numbering of which is not to be construed as designating levels of importance or relevance.

Example 1. An apparatus for integrating custom content object repositories within a website building system, the apparatus comprising at least one processor and at least one non-transitory computer readable storage medium storing instructions that, when executed by the at least one processor, cause the apparatus to: retrieve a website identifier associated with a website assembled based at least in part on one or more website building repositories, wherein the website identifier is selected from a plurality of website identifiers, and wherein the website identifier is associated with an editing user identifier of the plurality of editing user identifiers; generate a content object selection interface comprising a plurality of candidate content objects selected based at least in part on the website identifier and the one or more website editing historical interactions; cause rendering of the content object selection interface via a first computing device associated with the editing user identifier; responsive to receiving, from the first computing device, selection signals indicative of one or more selected candidate content objects, transform, using a trained customization model and based at least in part on the editing user identifier, one or more of the one or more selected candidate content objects into a custom contextualized content object; and add the custom contextualized content objects to a custom content object repository associated with the website identifier.

Example 2. An apparatus according to Example 1, wherein the one or more website building repositories store one or more website building components and one or more website editing historical interactions associated with a plurality of editing user identifiers.

Example 3. An apparatus according to any of the foregoing Examples, wherein the selection signals are received based on interaction via the first computing device with the content object selection interface.

Example 4. An apparatus according to any of the foregoing Examples, wherein the custom contextualized content objects comprise contextualized digital images generated in accordance with an overlay digital image.

Example 5. An apparatus according to any of the foregoing Examples, wherein generating the contextualized digital images comprises applying the trained customization model to the overlay digital image and a selected candidate content object.

Example 6. An apparatus according to any of the foregoing Examples, wherein the trained customization model is configured to generate the contextualized digital images such that the contextualized digital images are substantially indistinguishable from captured digital images.

Example 7. An apparatus according to any of the foregoing Examples, wherein the trained customization model is configured to generate an overlay digital image based on applying a large language model to a natural language prompt.

Example 8. An apparatus according to any of the foregoing Examples, wherein supplemental custom contextualized content objects are added to the custom content object repository associated with the website identifier responsive to subsequent interactions with the website identifier associated with an end user identifier.

Example 9. An apparatus according to any of the foregoing Examples, wherein the supplemental custom contextualized content objects are added to the custom content object repository based on attributes and historical interactions associated with the end user identifier.

Example 10. An apparatus according to any of the foregoing Examples, wherein a request for fulfillment of one or more custom contextualized content objects is transmitted to a third-party application based on a selection of the one or more contextualized content objects.

Example 11. A computer-implemented method for integrating custom content object repositories within a website building system, computer-implemented method comprising: retrieving, using one or more processors, a website identifier associated with a website assembled based at least in part on one or more website building repositories, wherein the website identifier is selected from a plurality of website identifiers, and wherein the website identifier is associated with an editing user identifier of the plurality of editing user identifiers; generating, using the one or more processors, a content object selection interface comprising a plurality of candidate content objects selected based at least in part on the website identifier and the one or more website editing historical interactions; causing, using the one or more processors, rendering of the content object selection interface via a first computing device associated with the editing user identifier; responsive to receiving, from the first computing device, selection signals indicative of one or more selected candidate content objects, transforming, using the one or more processors and a trained customization model, and based at least in part on the editing user identifier, one or more of the one or more selected candidate content objects into a custom contextualized content object; and adding, using the one or more processors, the custom contextualized content objects to a custom content object repository associated with the website identifier.

Example 12. A computer-implemented method according to Example 11, wherein the one or more website building repositories store one or more website building components and one or more website editing historical interactions associated with a plurality of editing user identifiers.

Example 13. A computer-implemented method according to any of the foregoing Examples, wherein the selection signals are received based on interaction via the first computing device with the content object selection interface.

Example 14. A computer-implemented method according to any of the foregoing Examples, wherein the custom contextualized content objects comprise contextualized digital images generated in accordance with an overlay digital image.

Example 15. A computer-implemented method according to any of the foregoing Examples, wherein generating the contextualized digital images comprises applying the trained customization model to the overlay digital image and a selected candidate content object.

Example 16. A computer-implemented method according to any of the foregoing Examples, wherein the trained customization model is configured to generate the contextualized digital images such that the contextualized digital images are substantially indistinguishable from captured digital images.

Example 17. A computer-implemented method according to any of the foregoing Examples, wherein the trained customization model is configured to generate an overlay digital image based on applying a large language model to a natural language prompt.

Example 18. A computer-implemented method according to any of the foregoing Examples, wherein supplemental custom contextualized content objects are added to the custom content object repository associated with the website identifier responsive to subsequent interactions with the website identifier associated with an end user identifier.

Example 19. A computer-implemented method according to any of the foregoing Examples, wherein the supplemental custom contextualized content objects are added to the custom content object repository based on attributes and historical interactions associated with the end user identifier.

Example 20. A computer-implemented method according to any of the foregoing Examples, wherein a request for fulfillment of one or more custom contextualized content objects is transmitted to a third-party application based on a selection of the one or more contextualized content objects.

Example 21. One or more non-transitory computer-readable storage media for integrating custom content object repositories within a website building system, the one or more non-transitory computer-readable storage media including instructions that, with one or more processors, cause the one or more processors to: retrieve a website identifier associated with a website assembled based at least in part on one or more website building repositories, wherein the website identifier is selected from a plurality of website identifiers, and wherein the website identifier is associated with an editing user identifier of the plurality of editing user identifiers; generate a content object selection interface comprising a plurality of candidate content objects selected based at least in part on the website identifier and the one or more website editing historical interactions; cause rendering of the content object selection interface via a first computing device associated with the editing user identifier; responsive to receiving, from the first computing device, selection signals indicative of one or more selected candidate content objects, transform, using a trained customization model and based at least in part on the editing user identifier, one or more of the one or more selected candidate content objects into a custom contextualized content object; and add the custom contextualized content objects to a custom content object repository associated with the website identifier.

Example 22. One or more non-transitory computer-readable storage media according to Example 21, wherein the one or more website building repositories store one or more website building components and one or more website editing historical interactions associated with a plurality of editing user identifiers.

Example 23. One or more non-transitory computer-readable storage media according to any of the foregoing Examples, wherein the selection signals are received based on interaction via the first computing device with the content object selection interface.

Example 24. One or more non-transitory computer-readable storage media according to any of the foregoing Examples, wherein the custom contextualized content objects comprise contextualized digital images generated in accordance with an overlay digital image.

Example 25. One or more non-transitory computer-readable storage media according to any of the foregoing Examples, wherein generating the contextualized digital images comprises applying the trained customization model to the overlay digital image and a selected candidate content object.

Example 26. One or more non-transitory computer-readable storage media according to any of the foregoing Examples, wherein the trained customization model is configured to generate the contextualized digital images such that the contextualized digital images are substantially indistinguishable from captured digital images.

Example 27. One or more non-transitory computer-readable storage media according to any of the foregoing Examples, wherein the trained customization model is configured to generate an overlay digital image based on applying a large language model to a natural language prompt.

Example 28. One or more non-transitory computer-readable storage media according to any of the foregoing Examples, wherein supplemental custom contextualized content objects are added to the custom content object repository associated with the website identifier responsive to subsequent interactions with the website identifier associated with an end user identifier.

Example 29. One or more non-transitory computer-readable storage media according to any of the foregoing Examples, wherein the supplemental custom contextualized content objects are added to the custom content object repository based on attributes and historical interactions associated with the end user identifier.

Example 30. One or more non-transitory computer-readable storage media according to any of the foregoing Examples, wherein a request for fulfillment of one or more custom contextualized content objects is transmitted to a third-party application based on a selection of the one or more contextualized content objects.

Conclusion

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

The invention claimed is:

1. An apparatus for integrating custom content object repositories within a website building system, the apparatus comprising at least one processor and at least one non-transitory computer readable storage medium storing instructions that, when executed by the at least one processor, cause the apparatus to:

retrieve a website identifier associated with a website assembled based at least in part on one or more website building repositories, wherein the website identifier is selected from a plurality of website identifiers, and wherein the website identifier is associated with an editing user identifier of the plurality of editing user identifiers;

generate a content object selection interface comprising a plurality of candidate content objects selected based at least in part on the website identifier and the one or more website editing historical interactions;

cause rendering of the content object selection interface via a first computing device associated with the editing user identifier;

responsive to receiving, from the first computing device, selection signals indicative of one or more selected candidate content objects, transform, using a trained customization model and based at least in part on the editing user identifier, one or more of the one or more selected candidate content objects into a custom contextualized content object; and add the custom contextualized content objects to a custom content object repository associated with the website identifier.

2. The apparatus of claim 1, wherein the one or more website building repositories store one or more website building components and one or more website editing historical interactions associated with a plurality of editing user identifiers.

3. The apparatus of claim 1, wherein the selection signals are received based on interaction via the first computing device with the content object selection interface.

4. The apparatus of claim 1, wherein the custom contextualized content objects comprise contextualized digital images generated in accordance with an overlay digital image.

5. The apparatus of claim 4, wherein generating the contextualized digital images comprises applying the trained customization model to the overlay digital image and a selected candidate content object.

6. The apparatus of claim 5, wherein the trained customization model is configured to generate the contextualized digital images such that the contextualized digital images are substantially indistinguishable from captured digital images.

7. The apparatus of claim 1, wherein the trained customization model is configured to generate an overlay digital image based on applying a large language model to a natural language prompt.

8. The apparatus of claim 1, wherein supplemental custom contextualized content objects are added to the custom content object repository associated with the website identifier responsive to subsequent interactions with the website identifier associated with an end user identifier.

9. The apparatus of claim 8, wherein the supplemental custom contextualized content objects are added to the custom content object repository based on attributes and historical interactions associated with the end user identifier.

10. The apparatus of claim 1, wherein a request for fulfillment of one or more custom contextualized content objects is transmitted to a third-party application based on a selection of the one or more contextualized content objects.

11. A computer-implemented method for integrating custom content object repositories within a website building system, computer-implemented method comprising:
  retrieving, using one or more processors, a website identifier associated with a website assembled based at least in part on one or more website building repositories, wherein the website identifier is selected from a plurality of website identifiers, and wherein the website identifier is associated with an editing user identifier of the plurality of editing user identifiers;
  generating, using the one or more processors, a content object selection interface comprising a plurality of candidate content objects selected based at least in part on the website identifier and the one or more website editing historical interactions;
  causing, using the one or more processors, rendering of the content object selection interface via a first computing device associated with the editing user identifier;
  responsive to receiving, from the first computing device, selection signals indicative of one or more selected candidate content objects, transforming, using the one or more processors and a trained customization model, and based at least in part on the editing user identifier, one or more of the one or more selected candidate content objects into a custom contextualized content object; and
  adding, using the one or more processors, the custom contextualized content objects to a custom content object repository associated with the website identifier.

12. The computer-implemented method of claim 11, wherein the one or more website building repositories store one or more website building components and one or more website editing historical interactions associated with a plurality of editing user identifiers.

13. The computer-implemented method of claim 11, wherein the selection signals are received based on interaction via the first computing device with the content object selection interface.

14. The computer-implemented method of claim 11, wherein the custom contextualized content objects comprise contextualized digital images generated in accordance with an overlay digital image.

15. The computer-implemented method of claim 14, wherein generating the contextualized digital images comprises applying the trained customization model to the overlay digital image and a selected candidate content object.

16. The computer-implemented method of claim 15, wherein the trained customization model is configured to generate the contextualized digital images such that the contextualized digital images are substantially indistinguishable from captured digital images.

17. The computer-implemented method of claim 11, wherein the trained customization model is configured to generate an overlay digital image based on applying a large language model to a natural language prompt.

18. The computer-implemented method of claim 11, wherein supplemental custom contextualized content objects are added to the custom content object repository associated with the website identifier responsive to subsequent interactions with the website identifier associated with an end user identifier.

19. The computer-implemented method of claim 18, wherein the supplemental custom contextualized content objects are added to the custom content object repository based on attributes and historical interactions associated with the end user identifier.

20. The computer-implemented method of claim 11, wherein a request for fulfillment of one or more custom contextualized content objects is transmitted to a third-party application based on a selection of the one or more contextualized content objects.

21. One or more non-transitory computer-readable storage media for integrating custom content object repositories within a website building system, the one or more non-transitory computer-readable storage media including instructions that, with one or more processors, cause the one or more processors to:
  retrieve a website identifier associated with a website assembled based at least in part on one or more website building repositories, wherein the website identifier is selected from a plurality of website identifiers, and wherein the website identifier is associated with an editing user identifier of the plurality of editing user identifiers;
  generate a content object selection interface comprising a plurality of candidate content objects selected based at least in part on the website identifier and the one or more website editing historical interactions;
  cause rendering of the content object selection interface via a first computing device associated with the editing user identifier;
  responsive to receiving, from the first computing device, selection signals indicative of one or more selected candidate content objects, transform, using a trained customization model and based at least in part on the editing user identifier, one or more of the one or more selected candidate content objects into a custom contextualized content object; and add the custom contextualized content objects to a custom content object repository associated with the website identifier.

22. The one or more non-transitory computer-readable storage media of claim 21, wherein the one or more website building repositories store one or more website building components and one or more website editing historical interactions associated with a plurality of editing user identifiers.

23. The one or more non-transitory computer-readable storage media of claim 21, wherein the selection signals are received based on interaction via the first computing device with the content object selection interface.

24. The one or more non-transitory computer-readable storage media of claim 21, wherein the custom contextualized content objects comprise contextualized digital images generated in accordance with an overlay digital image.

25. The one or more non-transitory computer-readable storage media of claim 24, wherein generating the contextualized digital images comprises applying the trained customization model to the overlay digital image and a selected candidate content object.

26. The one or more non-transitory computer-readable storage media of claim 25, wherein the trained customization model is configured to generate the contextualized digital images such that the contextualized digital images are substantially indistinguishable from captured digital images.

27. The one or more non-transitory computer-readable storage media of claim 21, wherein the trained customization model is configured to generate an overlay digital image based on applying a large language model to a natural language prompt.

28. The one or more non-transitory computer-readable storage media of claim 21, wherein supplemental custom contextualized content objects are added to the custom content object repository associated with the website identifier responsive to subsequent interactions with the website identifier associated with an end user identifier.

29. The one or more non-transitory computer-readable storage media of claim 28, wherein the supplemental custom contextualized content objects are added to the custom content object repository based on attributes and historical interactions associated with the end user identifier.

30. The one or more non-transitory computer-readable storage media of claim 21, wherein a request for fulfillment of one or more custom contextualized content objects is transmitted to a third-party application based on a selection of the one or more contextualized content objects.

\* \* \* \* \*